United States Patent [19]
Guckel et al.

[11] Patent Number: 5,644,177
[45] Date of Patent: Jul. 1, 1997

[54] MICROMECHANICAL MAGNETICALLY ACTUATED DEVICES

[75] Inventors: Henry Guckel; Jonathan L. Klein; Thomas L. Earles, all of Madison, Wis.

[73] Assignee: Wisconsin Alumni Research Foundation, Madison, Wis.

[21] Appl. No.: 393,432

[22] Filed: Feb. 23, 1995

[51] Int. Cl.$^6$ ............................ H02K 15/00; H02K 57/00
[52] U.S. Cl. .............. 310/40 MM; 310/42; 310/DIG. 6
[58] Field of Search ............................. 335/250; 310/12, 310/28, 29, 30, 17, 42, 40 MM, DIG. 6

[56] References Cited

U.S. PATENT DOCUMENTS

| | | | |
|---|---|---|---|
| 2,391,678 | 12/1945 | Bundy | 335/250 |
| 4,797,211 | 1/1989 | Ehrfeld et al. | 210/321.84 |
| 4,872,888 | 10/1989 | Ehrfeld et al. | 55/522 X |
| 5,189,777 | 3/1993 | Guckel et al. | 29/424 |
| 5,190,637 | 3/1993 | Guckel | 205/118 |
| 5,206,983 | 5/1993 | Guckel et al. | 29/598 |
| 5,327,033 | 7/1994 | Guckel et al. | 310/40 MM |
| 5,357,807 | 10/1994 | Guckel et al. | 73/721 |
| 5,378,583 | 1/1995 | Guckel et al. | 430/325 |
| 5,454,904 | 10/1995 | Ghezzo et al. | 216/13 |

OTHER PUBLICATIONS

E. W. Becker, et al., "Fabrication of Microstructures with High Aspect Ratios and Great Structural Heights by Synchrotron Radiation Lithography Galvanoforming, and Plastic Moulding (LIGA process)", Microelectronic Engineering, vol. 4, No. 1, May 1986, pp. 33–56.

W. Ehrfeld, et al., "Fabrication of Microstructures Using the LIGA Process", Proc. IEEE Micro Robots and Teleoperators Workshop, No. 9–11, 1987, pp. 1–11.

P. Hagmann, et al., "Fabrication of Microstructures of Extreme Structural Heights by Reaction Injection Moulding", International Polymer Processing IV, 1989, 188–195 month unknown.

W. Ehrfeld, et al., "Microfabrication of Sensors and Actuators for Microrobots", Proc. IEEE International Workshop on Intelligent Robots and Systems, Tokyo, Japan, October 21 –Nov. 2, 1998, pp. 3–7.

W. Ehrfeld, "Three Dimensional Microfabrication Using Synchrotron Radiators", International Symposium on X–ray Synchrotron Radition and Advanced Science and Technology Feb., 15–16, 1990, pp. 121–141.

W. Ehrfeld, et al., "LIGA Process: Sensor Construction Techniques Via X–Ray Lithography," Technical Digest, IEEE Solid State Sensor and Actuator Workshop, 1988, pp. 1–4. month unknown.

(List continued on next page.)

Primary Examiner—Steven L. Stephan
Assistant Examiner—Judson H. Jones
Attorney, Agent, or Firm—Foley & Lardner

[57] ABSTRACT

Micromechanical structures capable of actuation for purposes such as fluid flow control are formed on substrates in sizes in the range of one or two millimeters or less using micromechanical processing techniques. A magnetic core having a gap therein is fixed on the substrate, and a plunger is mounted by a spring for movement parallel to the substrate in response to the flux provided to the gap of the fixed core. An electrical coil wound around a mandrel is engaged to the fixed magnetic core such that flux is induced in the core when current is supplied to the coil, driving the plunger against the force of the spring. A micromechanical fluid control unit includes a metal frame structure formed by electrodeposition on a substrate with the inner wall of the frame having slots formed therein to admit a separator wall which divides the interior of the frame into separate chambers, with a cover secured over the top of the frame and the separator wall to seal the chambers. A plunger actuator can be mounted within the frame with fixed core sections extending through the walls of the frame, and with the mandrel and coil engaged to the fixed core sections outside of the frame to provide magnetic flux to a gap to actuate the plunger within the sealed enclosure.

30 Claims, 13 Drawing Sheets

OTHER PUBLICATIONS

H. Guckel, et al., "Deep X-Ray and UV Lithographies for Micromechanics", Technical Digest, IEEE Solid State Sensor and Actuator Workshop, Hilton Head, South Carolina, Jun. 4–7, pp. 118–122.

H. Guckel, et al., "Fabrication of Assembled Micromechanical Components via Deep X-Ray Lithography", Proceedings of IEEE Micro Electro Mechanical Systems (MEMS) 1991, Nara, Japan, 30 Jan. –2 Feb., 1991.

W. Menz, et al., "The LIGA Technique—a Novel Concept for Microstructures and the Combination with Si–Technologies by Injection Molding", Proceedings of IEEE Micro Electro Mechanical Systems (MEMS) 1991, Nara, Japan, 30 Jan. 2 Feb., 1991, pp. 69–73.

J. Mohr, et al., "Fabrication of Microsensor and Microactuator Elements by the LIGA–Process", Proceedings of Transducers '91, San Francisco, CA, Jun. 24–27, 1991, pp. 607–609.

H. Guckel, et al. "Fabrication and Testing of the Planar Magnetic Micromotor", Journal of Micromechanics and Microengineering, IOP Publishing, England, vol. 1, No. 3, Dec. 1991.

H. Guckel, "On the Application of Deep X-Ray Lithography and Metal Plating to Micromechanics and Micromagnetics," The Second International Symposium on MicroMachine and Human Science, Nagoya, Japan, Oct. 8 and 9, 1991.

H. Guckel, et al., "On the Application of Deep X-Ray Lithography with Sacrificial Layers to Sensors and Actuator Construction (the Magnetic Micromotor with Power Takeoffs)," Proceedings '91 of Transducers '91, San Francisco, CA, Jun. 24–27, 1991.

H. Guckel, et al., "Microactuator Production Via High Aspect Ratio, High Edge Acuity Metal Fabrication Technology," Microtechnologies and Applications to Space Systems Conference, JPL, Pasadena, Calif., May 27, 1992.

H. Guckel, et al., "Fabrication and Testing of Metal Micromechanisms with Rotational and Translational Motion," SPIE Conf., Orlando, Fla., May, 1992.

H. Guckel, et al., "Deep X-Ray Lithography, Metal Plating and Assembly as Fabrication Tools for Micromechanics," 11th Sensor Symposium, Japan IEE, Tokyo, Japan, Jun., 1992.

H. Guckel, et al., "Metal Micromechanisms Via Deep X-Ray Lithography, Electroplating and Assembly," Actuators '92, Bremen, Germany, Jun. 22, 1992.

H. Guckel, et al., "Electromagnetic, Spring Constrained Linear Actuator with Large Throw," Actuator '94, Bremen, Germany, Jun. 15–17, 1994.

T.R. Ohnstein, et al., "Tunable IR Filters Using Flexible Metallic Microstructures", Proceedings of IEEE Micro Electro Mechanical Systems (MEMS) 1995, Amsterdam, Holland, Jan. 29–Feb. 2, 1995.

T. R. Christenson, et al., "An Electromagnetic Micron Dynamometer", Proceeding of IEEE Micro Electro Mechanical Systems (MEMS) 1995, Amsterdam, Holland, Jan. 29 –Feb. 2, 1995.

FIG. 5
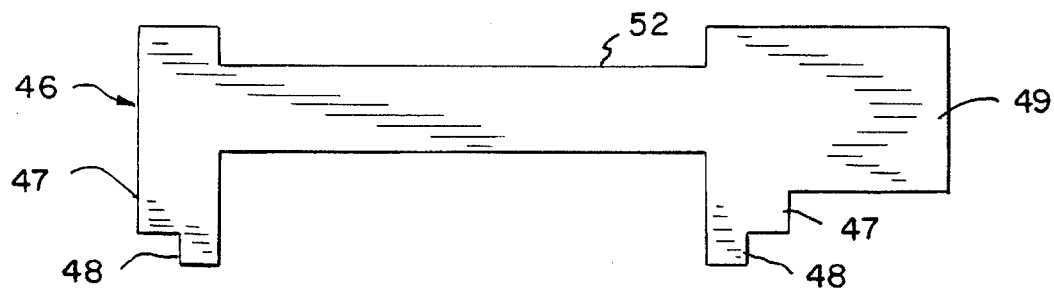
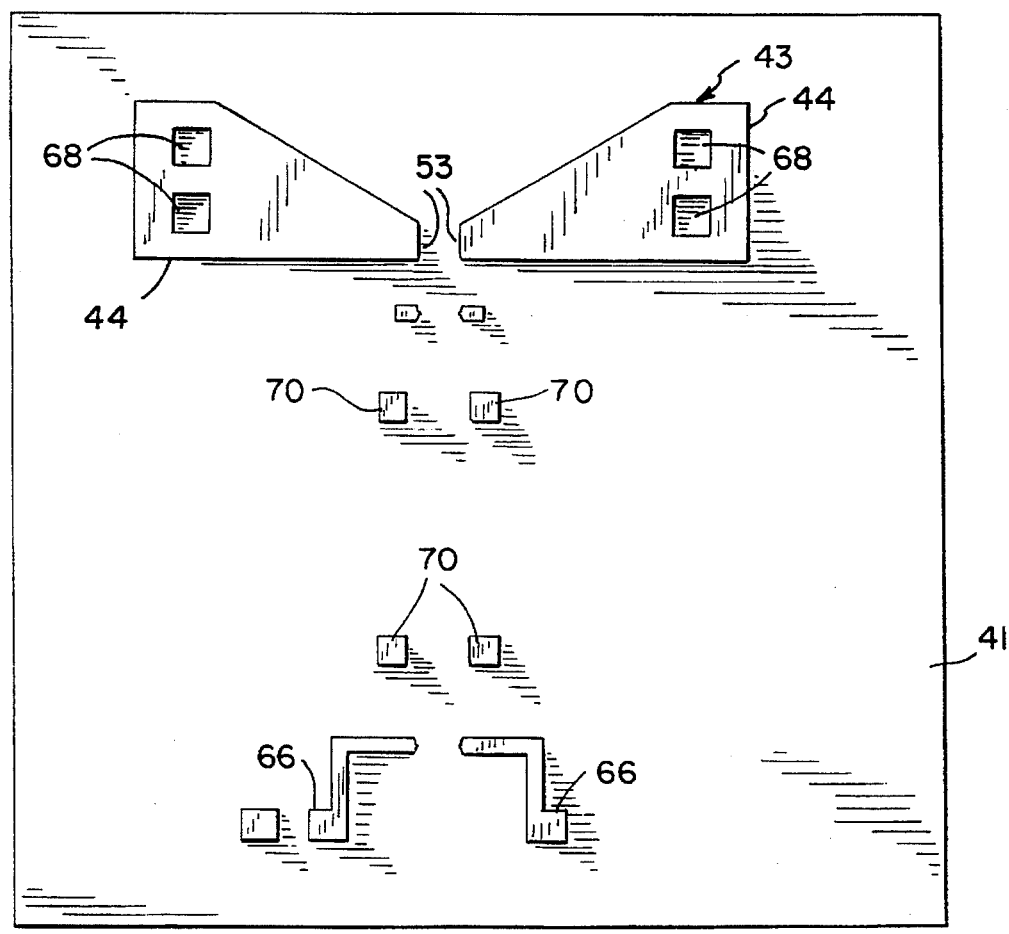
FIG. 6

MICROMECHANICAL MAGNETICALLY ACTUATED DEVICES

This invention was made with United States government support awarded by DOD, ARPA Grant No. N00014-93-1-0911 and Office of the NSF, Grant No. ECS9116566. The United States Government has certain rights in this invention.

FIELD OF THE INVENTION

This invention pertains generally to the field of semiconductor and micromechanical devices and processing techniques therefor, and particularly to micromechanical actuators and fluid control devices.

BACKGROUND OF THE INVENTION

Deep X-ray lithography involves a substrate which is covered by a thick photoresist, typically several hundred microns in thickness, which is exposed through a mask by X-rays. X-ray photons are much more energetic than optical photons, which makes complete exposure of thick photoresist films feasible and practical. Furthermore, since X-ray photons are short wavelength particles, diffraction effects which typically limit device dimensions to two or three wavelengths of the exposing radiation are absent for mask dimensions above 0.1 microns. If one adds to this the fact that X-ray photons are absorbed by atomic processes, standing wave problems, which typically limit exposures of thick photoresist by optical means, become an non-issue for X-ray exposures. The use of a synchrotron for the X-ray source yields high flux densities—several watts per square centimeter—combined with excellent collimation to produce thick photoresist exposures without any horizontal run-out. Locally exposed patterns should therefore produce vertical photoresist walls if a developing system with very high selectivity between exposed and unexposed photoresist is available. This requirement is satisfied for polymethylmethacrylate (PMMA) as the X-ray photoresist and an aqueous developing system. See, H. Guckel, et al., "Deep X-ray and UV Lithographies For Micromechanics" Technical Digest, Solid State Sensor and Actuator Workshop, Hilton Head, S.C., Jun. 4–7, 1990, pp. 118–122.

Deep X-ray lithography may be combined with electroplating to form high aspect ratio structures. This requires that the substrate be furnished with a suitable plating base prior to photoresist application. Typically this involves a sputtered film of adhesive metal such as chromium or titanium which is followed by a thin film of the metal which is to be plated. Exposure through a suitable mask and development are followed by electroplating. This results, after cleanup, in fully attached metal structures with very high aspect ratios. Such structures were first reported by W. Ehrfeld and coworkers at the institute for Nuclear Physics at the University of Karlsruhe in West Germany. Ehrfeld termed the process "LIGA" based on the first letters of the German words for lithography and electro-plating. A general review of the LIGA process is given in the article by W. Ehrfeld, et al., "LIGA Process: Sensor Construction Techniques Via X-Ray Lithography" Technical Digest IEEE Solid-State Sensor and Actuator Workshop, 1988, pp. 1–4.

A difficulty with the original LIGA process is that it can only produce fully attached metal structures. This restricts the possible application areas severely and unnecessarily. The addition of a sacrificial layer to the LIGA process facilitates the fabrication of fully attached, partially attached, or completely free metal structures. Because device thicknesses are typically larger than 10 microns and smaller than 300 microns, freestanding structures will not distort geometrically if reasonable strain control for the plated film is achieved. This fact makes assembly in micromechanics possible and thereby leads to nearly arbitrary three-dimensional structures. See H. Guckel, et al., "Fabrication of Assembled Micromechanical Components via Deep X-Ray Lithography," Proceedings of IEEE Micro Electro Mechanical Systems, Jan. 30-Feb. 2, 1991, pp. 74–79; and U.S. Pat. No. 5,189,777 to Guckel, et al.

Further extensions of the LIGA process have included the formation of magnetically driven micromechanical rotating motors, as shown in U.S. Pat. Nos. 5,206,983 and 5,327,033 to Guckel, et al. Complex multiple layer microstructures can be formed of metal, which can include sacrificial metal layers which are etched away by an etchant which does not affect the primary metal, as shown in U.S. Pat. No. 5,190,637 to Guckel. Significant improvements in the formation of microstructures, particularly those with very high aspect ratios, is obtained utilizing a preformed photoresist sheet, as described in U.S. Pat. No. 5,378,583 to Guckel, et al.

SUMMARY OF THE INVENTION

In accordance with the present invention, micromechanical structures capable of actuation for purposes such as fluid flow control are formed having dimensions in the range of one to two millimeters and less. Despite the small size of such structures, they are capable of electromagnetic actuation for purposes such as electrical switches, relays, flow control valves, and fluid pumps. The structures are formed in substantially planar arrangement on a substrate and are produced utilizing lithography processing in a manner which is compatible with the formation of electronic devices on the substrate (for example, a single crystal silicon substrate). Consequently, the micromechanical devices can be integrated physically with electrical devices as well as produced in accordance with electrical device processing.

An electromagnetically operated microactuator in accordance with the invention includes a magnetic core of ferromagnetic material which is fixed on the substrate and which acts as a flux guide. A gap is formed in the fixed core into which a head section of an armature plunger can move. The plunger is mounted for movement preferably parallel to the surface of the substrate and has a spring or springs operatively connected to it to urge the plunger to a return position. An electrical coil is coupled to the magnetic core such that when electrical current is supplied to the coil, the flux induced in the core draws the plunger into the gap or, alternatively, repels the plunger, to provide linear mechanical actuation which may be utilized for various purposes, e.g., to open or close a switch, to open or close a fluid control valve, or to operate a pump. The coil is coupled to the core in various ways. For example, two or more separate sections of the fixed magnetic core may be deposited on the substrate, and a separate coil section may be formed and assembled to the fixed core sections by engaging mating structures formed on the mandrel and fixed core to complete the magnetic flux path through the core. One preferred structure for the coil includes a ferromagnetic mandrel about which fine electrical wire conductor is wound, with the mating structure including pegs on the ends of the mandrel which are adapted to fit into receptacle holes in the ferromagnetic core sections fixed on the substrate. Alternatively, the coil can be wound on a temporary mandrel, which is subsequently removed to leave an air core coil which can be inserted onto a core formed on the substrate or be used with a plunger which extends into the coil.

The present invention further encompasses microactuators utilized in fluid control units, including valves and pumps. In a preferred structure for such fluid control components, a metal frame structure is formed by lithography techniques on a substrate so that it is tightly bonded to the substrate. Within the interior of the metal frame, control and actuator components are formed. By utilizing nonmagnetic metals for the frame, a magnetic metal material acting as a flux guide may be formed on the substrate to extend through the walls of the frame to terminate in a gap at which an armature plunger is mounted. The actuator can include a valve head mounted to the plunger which can be closed against a valve seat in a wall dividing two chambers of the interior of the frame to control the passage of fluid from one chamber to the other. A metal cover is secured to the top of the frame to complete the enclosure for the actuator and fully separate the two (or more) chambers within the enclosure. Entrance and exit openings for fluid flowing to and from the two chambers can be formed in the cover, the walls of the frame, or the substrate. Because the magnetic metal forming the flux guides extends from the interior to the exterior of the housing, the electrical coil which induces flux in the core can be mounted outside the housing, for example, either as a planar coil formed on the substrate or as a separate coil wound on a mandrel and assembled onto ferromagnetic core metal deposited on the substrate. In this manner, the electrical current carrying components are completely isolated from the fluid within the enclosure.

The micromechanical fluid control units of the present invention can be formed such that divider walls having various functions can be inserted into a standardized frame structure such that a frame or arrays of frames can be formed on a substrate and parts subsequently assembled thereto to perform specific functions. In a preferred frame structure, vertical slots are formed in opposed interior wall surfaces of the frame which are adapted to receive separately formed panels which, when fitted into the slots, form dividing walls with the appropriate fluid control structure formed therein, such as orifices, filters, or valve seats.

Further objects, features and advantages of the present invention will be apparent from the following detailed description when taken in conjunction with the accompanying drawings.

BRIEF DESCRIPTION OF THE DRAWINGS

In the drawings:

FIG. 5 is an illustrative side view of a mandrel which may be used for winding coils to form separate coil sections which can be assembled into the actuator of FIG. 1.

FIG. 6 is an illustrative plan view of the fixed metal structures formed on the substrate to provide the fixed magnetic core, mounting posts and electrical relay contacts for the actuator of FIG. 1.

DETAILED DESCRIPTION OF THE INVENTION

The micromechanical linear motion magnetic actuator of the present invention is preferably formed on a planar substrate on which a magnetic core is fixed which has an air gap toward which a magnetic plunger can be drawn or from which the plunger can be repulsed. A coil of electrical conductor is coupled to the core such that the core provides a flux guide for the flux induced from the coil, with the flux circuit completed through the gap. By utilizing deep X-ray lithography techniques to produce the metal structures, the actuator can be produced with high aspect ratio metal structures having dimensions from a few microns to a few millimeters and with submicron tolerances. As a result of the high aspect ratios and tight tolerances, actuators can be constructed which have relatively large forces despite their small size (for example, forces in the range of a millinewton). Further, the actuator is capable of a relatively large range of linear motion or throw. By supporting and constraining the plunger with a spring or springs, a range of linear motion in the hundreds of microns is obtainable. Further, the actuator can be operated in both a constant, or DC, mode, and in a resonant mode. Thus, the actuator can be configured as part of a microrelay, a micropump, a microvalve and a micropositioner. Further, the position of the plunger can be determined by measurement of the inductance of the coil, so that a simple and efficient position feedback mechanism is available. In addition, photodiodes may be integrated into a silicon (or other semiconductor) substrate to allow the position of the plunger to be measured and/or to allow driving of the actuator at resonance. By driving the photodiodes optically, the actuator can be driven into self-resonance, allowing optical actuation and sensing.

Figure 1:
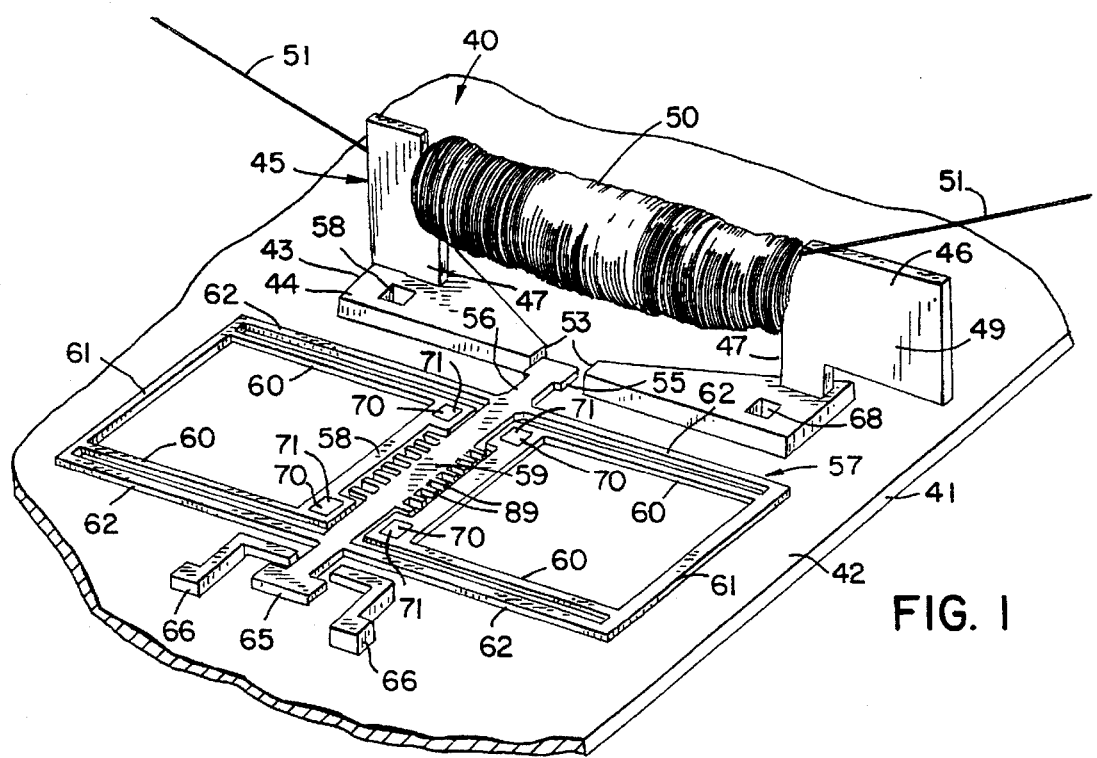
FIG. 1 is an illustrative perspective view of an actuator in accordance with the present invention.

An exemplary micromechanical linear actuator in accordance with the present invention is illustrated generally at 40 in FIG. 1. The actuator 40 is formed on a substrate 41, which may have a generally planar top surface 42 as shown. The substrate 41 may be formed of a variety of materials, including metals, plastics, ceramics, glasses, and semiconductors. Where electronic components are to be integrated with the actuator 40, it is preferable that the substrate 41 be a semiconductor, such as single crystal silicon, and it is a particular advantage of the present invention that the formation of the micromechanical structures is compatible with conventional photolithographic processing of semiconductors. The actuator 40 includes a fixed magnetic core 43 having two separate sections 44 formed, as described further below, on the surface 42 of the substrate 41. As illustrated in FIG. 1, the core sections 44 are formed generally in a planar fashion on the planar surface 42 of the substrate 41. In addition, a coil section 45 has an upright mandrel 46 which forms part of the magnetic core. The mandrel 46 has end sections 47 with pegs 48 formed thereon (not visible in FIG. 1) by which the mandrel engages the fixed sections 44 of the core formed on the substrate. A coil 50 of fine electrical wire, having outlet leads 51 for connection to a source of electrical power (not shown), is wound around a central core portion 52 of the mandrel 46 (obscured by the coil 50 in FIG. 1). Both the mandrel 46 and the fixed core sections 44 are formed of a ferromagnetic metal, such as nickel, iron, or nickel-iron alloys. End faces 53 of the core sections 44 are spaced from one another to define a gap into which a magnetic head 55 of an actuator plunger 56 extends. The plunger 56 or at least the head thereof is also formed of a magnetic material, for example a ferromagnetic metal. The plunger 56 is supported for linear movement by springs 57 which preferably provide a highly linear spring force. The springs 57 illustrated in FIG. 1 are rectangular type springs having a mounting section 58 on either side of the central body portion 59 of the actuator plunger 56 with openings 71 therein by which the springs are mounted to posts 70 extending from the substrate, outwardly extending sections 60 which join an outward end section 61, and inwardly extending sections 62 which extend from the end section 61 to join the plunger body 59. The spring sections 60, 61 and 62 are free of the substrate 41 and thus can move as the plunger 56 moves. In the embodiment shown in FIG. 1, the plunger includes an end conductor section 65 which is mounted adjacent to electrical contact leads 66 formed on the substrate which terminate at ends between the conductor section 65.

When the coil 50 is supplied with DC current on the leads 51, the magnetic head 55 of the plunger 56 will be drawn into the gap between the core sections 44, and the end conductor section 65 will be drawn into contact with the electrical leads 66 to complete an electrical circuit between these leads. Consequently, when the electrical contact leads 66 are connected to an electrical circuit (not shown), the actuator of FIG. 1 functions as an electrical relay which is controlled by the current provided to the coil 50 on the control lines 51. When the flow of current to the coil 50 is cut off, the springs 57 draw the plunger 56 back away from the gap between the core sections 44 and pull the conductor 65 out of electrical contact with the contact leads 66, breaking the circuit.

As discussed further below, the actuator 40 of FIG. 1 preferably is formed such that coil section 45, composed of the mandrel 46 with the coil 50 wound thereon, can be formed separately from the fixed core sections 44 and mounted thereto by mating structure on the mandrel and fixed core sections. To complete the magnetic circuit, pegs (not shown in FIG. 1) extending from the bottom of the mandrel ends are inserted into receptacle openings, such as the openings 68 illustrated in FIG. 1, which are formed in the core sections 44. By joining the mandrel to the fixed sections 44 of the core with mating structure in this manner, the magnetic flux circuit through the core and extending across the gap is completed.

Figure 4:
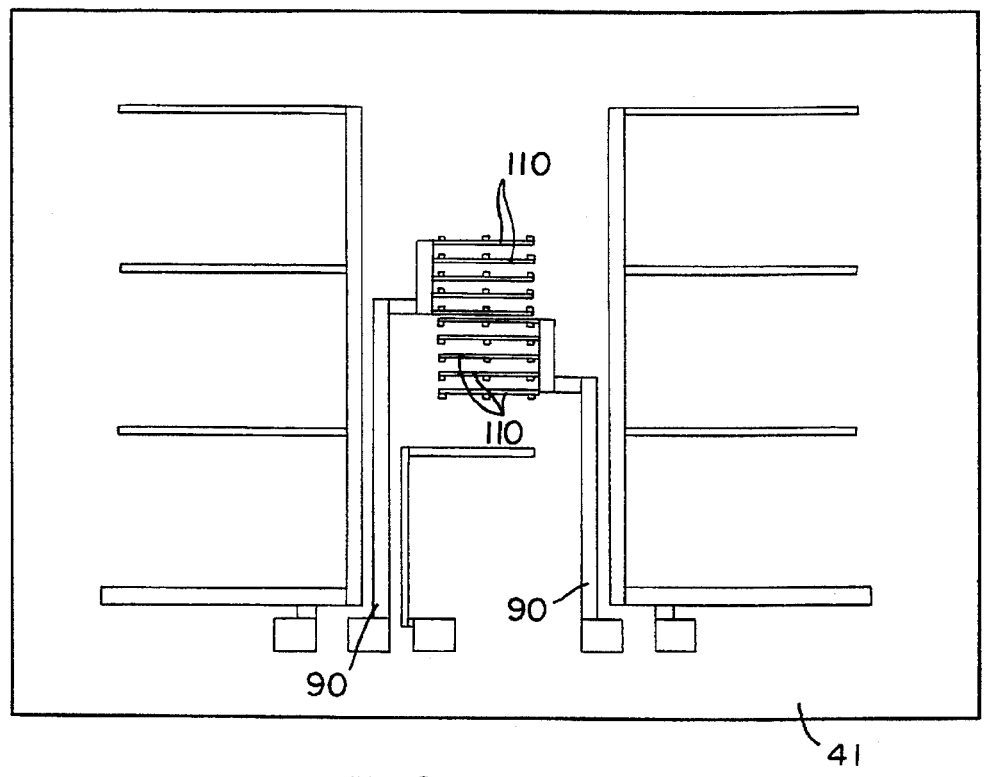
FIG. 4 is an illustrative view showing the pattern of conducting metal strips deposited on the substrate in forming the actuator of FIG. 1.

The plunger 56 may be formed with a series of parallel plates 89 extending outwardly from the central body portion 59 of the plunger, as illustrated in FIG. 1. The plates 89 may optionally be used where photodiodes (not shown in FIG. 1) are formed in the substrate 41 beneath the plunger. As illustrated in FIG. 4, electrical connecting paths 90 may be formed in the substrate 41 by doping or surface deposition of metal, etc. to provide paths for electrical connection to the photodiodes. When light is projected down onto the plunger 56, the light is either blocked or passed by the plates 89 on the plunger, depending on the position of the plunger. Consequently, as the plunger moves in and out, the light will alternately reach or be blocked from the photodiodes, such that movement of the plunger corresponds to a change in the output voltage from the photodiodes as seen at the electrical connections 90 extending to the diodes. If the output lines 90 are connected to the input leads 51 of the coil 50, and light is projected down onto the plunger where it is alternately obscured or passed by the plates 89 from reaching the photodiodes, the photodiodes will provide pulses of electricity to the coil when light reaches the photodiodes, causing the plunger to move and thereby obscure the light, resulting in the plunger being drawn back by the springs 57 to a position where light is again allowed to reach the photodiodes. The result is a self-sustaining reciprocation of the plunger 56 at a natural resonant frequency.

Figure 2:
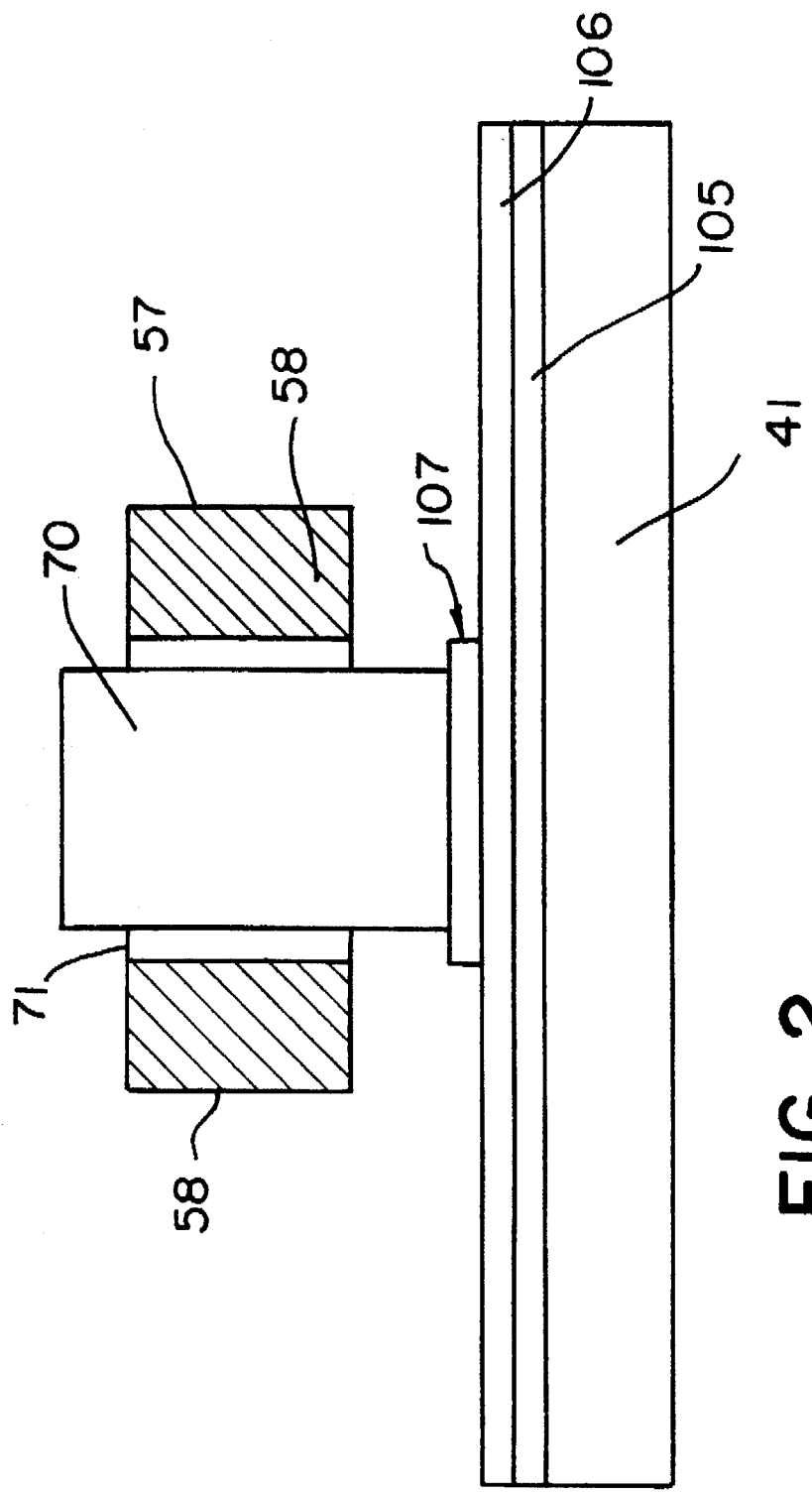
FIG. 2 is a cross-sectional view through a portion of the substrate, mounting post and spring assembled thereto in the actuator of FIG. 1.

The formation of the microactuators can be carried out in accordance with the above-described patents, particularly U.S. Pat. Nos. 5,189,777, 5,190,637, 5,206,983, and 5,378,583, the disclosures of which are incorporated herein by reference. A preferred processing sequence to produce the microactuators is described further below, and allows production of very small devices, typically 2 mm in height above the substrate or less, with high precision. The results of the processing may be illustrated with respect to the exemplary cross-sectional view of FIG. 2 (showing a cross-section through the juncture between a mounting post 70 and the adjacent portion 58 of the spring 57). To support the structures in a manner which electrically isolates the structures from the silicon substrate 41, a first layer of silicon dioxide 105 is thermally grown on a top surface of the silicon substrate 41, and a layer 106 of plasma enhanced chemical vapor deposition (PECVD) $SiO_2$ is then formed on the first $SiO_2$ layer 105. A plating base 107 is then applied to the layer 106, and the posts 70 (e.g., nickel/iron) are then plated onto the plating base 107. The portions 58 of the spring 57 may then be assembled onto the posts 70 with the opening 71 in the section 58 of the spring adapted in shape and size to admit and engage the posts 70.

Figure 3:
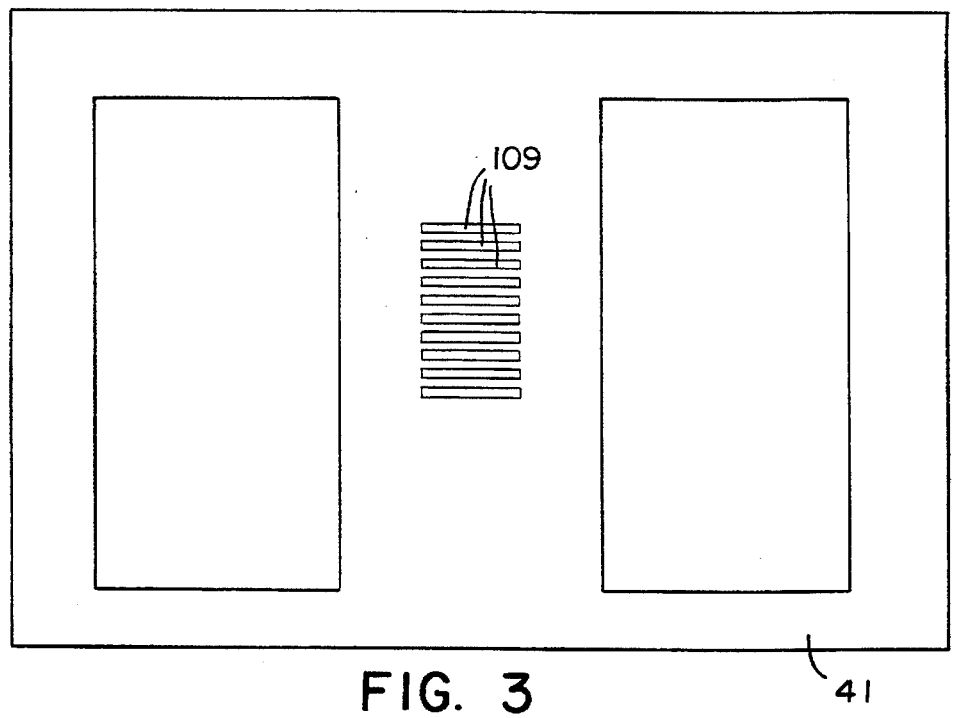
FIG. 3 is an illustrative plan view showing the areas of a semiconductor substrate that are implanted for providing photodiode implants for the photodiodes under the actuators of FIG. 1.

An exemplary formation of the photodiodes beneath the plunger 56 is illustrated in FIG. 3, which shows a mask pattern for forming a p-type dopant in a pattern 109 in the silicon substrate 41. As illustrated in FIG. 4, metal contacts 90 extending to the photodiode region include parallel contact strips 110 which are positioned to make electrical contact with the diffused p- regions 109.

The fabrication of the microactuator structures of FIG. 1 is carried out to form structures in which the plunger 56 may have dimensions in the range of a few thousand microns or less. The process of forming the actuators includes forming structures which are fixed on the substrate 41 and parts which are formed separately and then assembled onto the structures on the substrate. For example, in the actuator of FIG. 1, all of the structures except the springs 57, the plunger 56, the mandrel 46 and the coil 50 wound on it are formed to be fixed on the substrate, with the plunger and springs and the mandrel and coil then being assembled to the fixed structures. Of course, the springs 57 and plunger 56 may be formed if desired so that the portions of these structures which do not move are fixed to the substrate during forming steps. In the exemplary process set forth below, the parts fixed to the substrate are fabricated using a combination of thin film and thick film processing techniques, preferably on an oxidized silicon wafer as the substrate. The fixed magnetic core and mounting posts are preferably fabricated using deep X-ray lithography, with electroplating of magnetic metal such as permalloy into the resulting photoresist mold. The spring and plunger in the structure of FIG. 1 are fabricated as a unit using deep X-ray lithography and electroplating onto a sacrificial release layer. The sacrificial release layer is then sacrificially etched (dissolved), freeing the spring and plunger. The free part is then assembled onto the previously fabricated mounting posts. By fabricating the actuator on a silicon wafer substrate, electronics which interacts with the actuator may be integrated on the substrate as the actuator, for example, the photodiodes discussed above.

In fabrication of the linear actuator of FIG. 1, a total of three separate parts are fabricated and then assembled together. The structure affixed to the substrate consists of an open section of the magnetic path containing the air gap and receptacle holes for the coil, and mounting posts 70 for the spring 57 and plunger 56. The coil section 45 provides the rest of the magnetic flux path in the mandrel 46 for the wire coil 50. The final part is the spring 57 and plunger 56. The structures on the substrate are fabricated using deep X-ray lithography and electroplating. The free magnetic and plunger sections are fabricated using deep X-ray lithography and electroplating onto a release layer. The release layer is then sacrificially etched to free the parts. Once free, the mandrel 46 has very thin insulated electrical magnet wire wrapped around it to form the coil 50. The free coil section 45 is then assembled into the receptacle holes 68 on the fixed core sections 44 to complete the magnetic flux path. It is noted that several coil sections may be assembled in parallel and wired in series to increase the total magnetic flux for a given level of current. With reference to FIG. 1, for example, an additional coil section 45 may be mounted into the second (open) set of receptacle holes 68 in the magnetic core sections 44. It is also apparent that more than two sets of receptacle holes can be formed in the fixed core and more than two coils can be mounted on the core. Further, two coils mounted to a fixed core may be utilized as a transformer, if desired.

A plan view of the mandrel 46 is shown in FIG. 5 and a plan view of the structural components of the actuator of FIG. 1 which are fixed to the substrate 41 is shown in FIG. 6. As illustrated therein, openings 68 are provided in the fixed core sections 44 which are adapted to receive pegs 48 which extend from the mandrel 46 of the coil section 45. As illustrated in FIG. 5, the end sections 47 of the mandrel have downwardly extending tabs or pegs 48 formed on the bottom thereof which are adapted to fit into the receptacle openings 68. The mandrels 46 are preferably formed of a ferromagnetic material, such as nickel-iron alloys, using a sacrificial layer process which allows the mandrels 46, once formed, to be released from the substrate by dissolving the sacrificial layer so that they can have the coil 50 wound on the central core 52 of the mandrel before the mandrel and coil are assembled onto the fixed core 44. A tab 49 may be formed on the side of the mandrel as shown in FIG. 5 to facilitate grasping of the mandrel during winding of the coil and inserting of the assembled coil section into the fixed core.

It is apparent that the layouts of the actuator plunger, the springs and the magnetic core can be arranged in many other configurations. For example, the magnetic core sections 44 can be positioned within the springs 57 so that the magnetic plunger head 55 is formed in the middle of the plunger body 59 rather than at the end of the plunger body. The head 55 of the plunger may also have outwardly extending arms thereon which extend generally parallel to the sides of the core members 44 and which are drawn toward the core members 44 when current is supplied to the coil 50, resulting in a stronger attractive force applied to the plunger then with a head 55 as shown in FIG. 1 which is adapted to fit within the gap between the side faces 53. The plunger or a portion may be formed of a permanent magnet material, and the magnetic circuit may be arranged so that the plunger is repelled when the coil is energized. Although not necessarily preferred, the coil may be wound on the plunger rather than the fixed core.

A preferred magnetic material for the core is electro-deposited nickel and iron permalloy, e.g., 78% Ni, 22% Fe. This material saturates at about 1 Tesla, has a core coercivity of less than 0.3 Oersted and a permeability of 2000. The material is thus soft, which is highly desirable for current to field conversion, and has a maximum energy density of $4 \times 10^5$ newtons/m$^2$.

Figure 19:
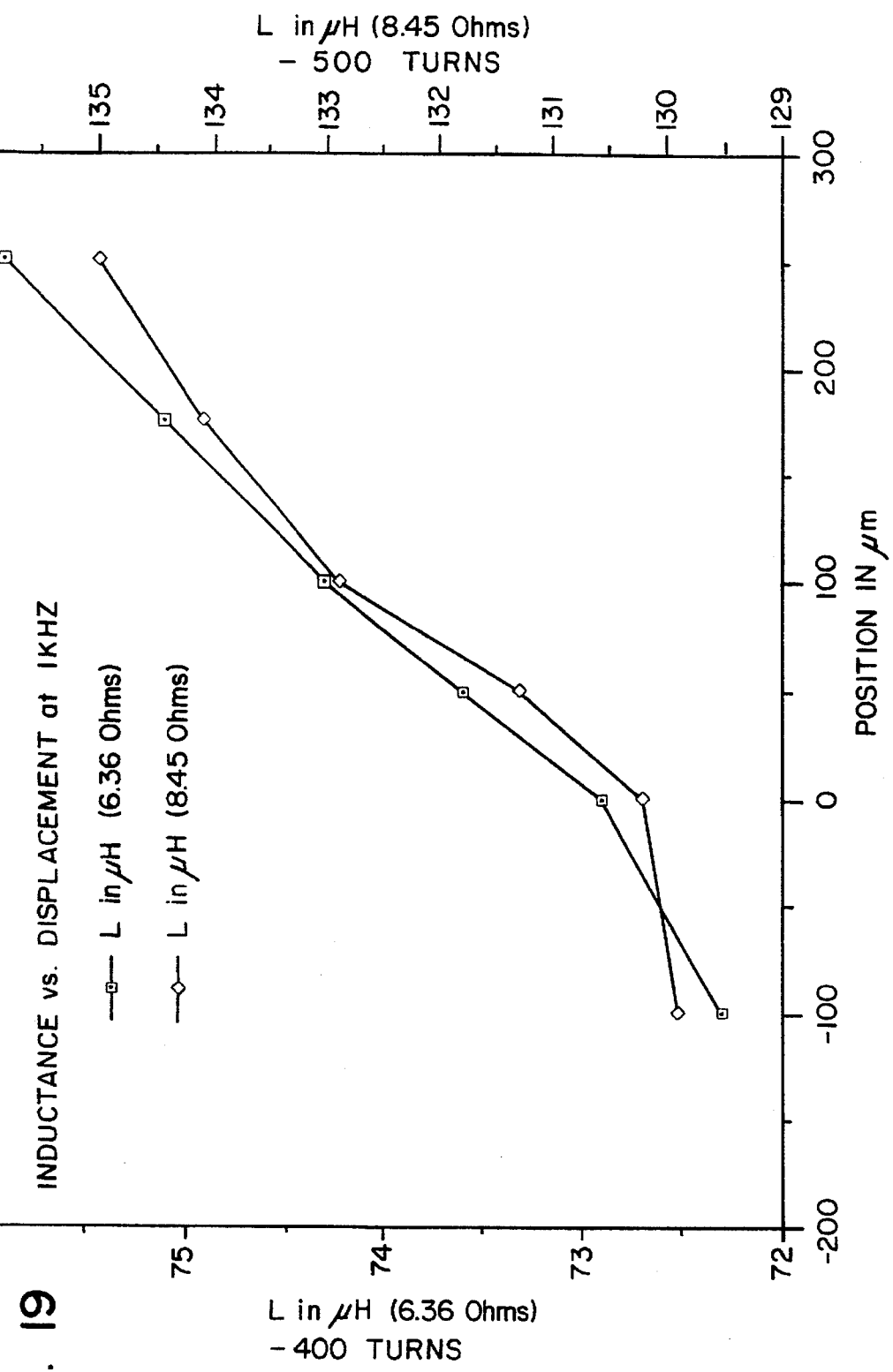
FIG. 19 is a graph illustrating the correlation between measured inductance at 1000 Hz and plunger position for the actuator of FIG. 1 for exemplary coils having 400 turns and 500 turns.

The effective inductance of the coil 50 of the microactuator of the present invention varies as a function of the position of the plunger with respect to the magnetic core. Consequently, the relative position of the plunger can be determined by measuring the instantaneous inductance of the coils. This may be done, for example, by actuating the coils with a selected level of DC current and applying a superimposed AC voltage signal to the coil that is of a sufficiently low voltage level and sufficiently high frequency so as not to affect the position of the plunger, and then measuring the high frequency current through the coil to determine the effective instantaneous reactance of the coil. The correlation between inductance and plunger position for exemplary actuators in accordance with FIG. 1 is shown in FIG. 19 for coils having 400 and 500 turns using a 1000 Hz AC signal to measure inductance in a conventional fashion. A comparable correlation may be determined with an air core coil in which a plunger moves in and out of the coil.

The process for producing the actuator of FIG. 1 requires two runs, one for the fixed structures for the magnetic circuit (the magnetic core) and the other for the free parts (spring and plunger, and the mandrel for the coil). The coil is formed by winding a fine electrical wire around the mandrel, and the mandrel and spring are then assembled as discussed above. The free parts for the actuator 40 of FIG. 1 are fabricated using the same process as for the free parts of the actuator of FIGS. 2 and 3. In the exemplary process discussed below, 47 gauge electrical wire is wrapped around the mandrel, e.g., using a commercial coil winder. The masks for the magnetic circuit include a PMMA pattern 1 for the fixed parts, and a PMMA pattern 2 for the free parts.

The following are examples of the formation of the micromechanical actuator in accordance with the present invention. In the discussion that follows, the equipment and materials set forth below are utilized.

Equipment
  Ultramiller: Reichert-Jung (used for fly cutting)
  Oxidation Furnace
  Oven
  Asher:
    Branson
  Aligner:
    Cannon 501
  Implanter
  Sputtering Machine:
    CVC (for Ti, Ni and Cu)
  Plasma Etcher
    PlasmaTherm PK 1241 RIE/Plasma Etcher ($O_2$ plasma and $CF_4$ RIE)
    PlasmaTherm Series 70 ($CHF_3$ only)
  PECVD Furnace:
    PlasmaTherm Series 70 ($SiO_2$ deposition)
  SRC—University of Wisconsin Synchrotron Radiation Center Aladdin Synchrotron.
Materials
  Chemicals
  Photoresists:
    Microposit 1400-27 Photoresist (Shipley)
    Microposit 1827 Photoresist (Shipley)
    AZ 1375 (AZ Corp.—Hoechst-Celanese)
  Photoresist Developers:
    Microposit MF-321 Developer (Shipley)
  PMMA (polymethylmethacrylate)
    PMMA 496K (9%) (#897548—KTI Chemical Inc.)
  MMA
    Methyl Methacrylate (99%) inhibited with 10 ppm MEHQ (M5, 590-9 Aldrich)
  PMMA Developer:
    60% by vol. 2-(2-butoxyethoxy) ethanol
    20% by vol. tetrahydro-1-4 oxazin (Morpholine)
    5% by vol. 2-aminoethanol (ethanolamine)
    15% by vol. deionized water (DI)
  PMMA First Rinse
    20% by vol. 2-(2-butoxyethoxy) ethanol
    80% by vol. deionized water
  Polyimide Release Layer:
    PiRL (III) (Brewer Science Inc., Rolla, Mo.)
  Cu plating bath
  NiFe plating bath
Integrated Photodiodes The photodiodes allow position measurement and/or optical excitation. If the photodiodes are eliminated, the process is simplified, requiring fewer mask levels. The mask levels are: (1) photodiode implant; (2) substrate contact implant; (3) photodiode contact holes; (4) metalization pattern; (5) PECVD oxide holes; (6) plating base pattern; (7) polymethyl methacrylate (PMMA) pattern No. 1. For the free structures, an eighth mask level is required: (8) PMMA pattern 2.

The following processing sequence may be used to fabricate linear actuators with integrated photodiodes. The steps used for photodiode fabrication may be omitted where such photodiodes are not desired.

Substrate silicon material:
  Wacker CZ, 20±1 mil
  (100), n-type, 0.8–1.2 Ω·cm
Initial Oxidation
  Clean
  $NH_4OH:H_2O_2:H_2O$—1:1:6 in ultrasound for 10 min.
  rinse—DI dilution rinse for 15 min.
  $H_2SO_4$—180° C. two baths each for 3 min.
  rinse—DI for 5 min.
  $HF:H_2O$—1:50 for 2 min.
  rinse—DI dilution rinse for 10 min.
  $NH_4OH:H_2O_2:H_2O$—1:1:6 80° C. for 10 min.
  rinse—DI dilution rinse for 20 min.
  Oxidation
  wet—1050° C. for 70 min. (to about 5000 Å)
  $N_2$ anneal for 15 min.
Diode Implant
  Spin Photoresist
    1400-27 at 5 krpm for 30 sec.
  Prebake
    90° C. for 30 min.
  Expose Mask 1
    Canon 501 Aligner—soft contact, integrated exposure of 5.0
  Develop
    MF-321—1 bath for 60 sec.
    rinse—DI for 5 min.
  Postbake
    90° C. for 30 min.
  Oxide Cut
    Buffered HF—$NH_4F:HF$ 9:1 until dewet +15 sec. (~1000 Å/sec.)
    rinse—DI for 10 min.
  Implant photodiode
    boron—80 kev, $10^{14}$ $cm^{-2}$
  Strip Photoresist
    Photoresist ash—5 min. intervals until clear (~10—15 min. in total)
    piranha etch for 10 min.
    rinse—DI for 10 min.
  Dehydration Bake
    bake in vacuum oven at 200° C. (3 hours minimum)
Substrate Contact Implant
  Spin Photoresist
    1400-27 at 5 krpm for 30 sec.
  Prebake
    90° C. for 30 min.
  Expose Mask 2
    Canon 501 Aligner—soft contact, integrated exposure of 5.0
  Develop
    MF-321—1 bath for 60 sec.
    rinse—DI for 5 min.

Postbake
   90° C. for 30 min.
Oxide Cut
   Buffered HF—NH$_4$F:HF 9:1 for same time as diode oxide cut
Implant substrate contact
   phosphorous—100 keV, 2×10$^{15}$ cm$^{-2}$
Strip Photoresist
   Photoresist ash—5 min. intervals until clear
   piranha etch for 10 min.
   rinse—DI for 10 min.
Second Oxidation/Implant Activation
   Clean
   NH$_4$OH:H$_2$O$_2$:H$_2$O—1:1:6 in ultrasound for 10 min.
   rinse—DI dilution rinse for 15 min.
   H$_2$SO$_4$—180° C. two baths each for 3 min.
   rinse—DI for 5 min.
   HF:H$_2$O—1:50 for 2 min.
   rinse—DI dilution rinse for 10 min.
   NH$_4$OH:H$_2$O$_2$:H$_2$O—1:1:6 80° C. for 10 min.
   rinse—DI dilution rinse for 20 min.
   Oxidation
      wet—980° C. for 30 min. (about 1500 Å)
   N$_2$ anneal for 15 min.
Diffusion Contact Cut
   Spin Photoresist
      1400–27 at 5 krpm for 30 sec.
   Prebake
      90° C. for 30 min.
   Expose Mask 3
      Canon 501 Aligner—soft contact, integrated exposure of 5.0
   Develop
      MF-321—1 bath for 60 Sec.
      rinse—DI for 5 min.
   Postbake
      90° C. for 30 min.
   Oxide Etch
      Buffered HF-NH$_4$F:HF 9:1—etch until dewet +15 sec. (~2 min.)
      rinse—DI for 10 min.
   Strip Photoresist
      piranha etch for 10 min.
      rinse—DI for 10 min.
Metalization
   Pre-Ohmic Clean
      H$_2$SO$_4$—180° C. for 6 min.
      rinse—DI for 5 min.
      HF—50:1 for 45 Sec.
      rinse—DI for 5 min.
   Sputter Metalization CVC
      heat cycle—160° C. for 5 min.
      cool—5 min.
      sputter 200 Å Ti
      sputter 2 µm Ni
      cool—30 min.
   Spin Photoresist
      1375 at 5 krpm for 30 sec.
   Prebake
      90° C. for 30 min.
   Expose Mask 4
      Canon 501 Aligner—soft contact, integrated exposure of 12.0
   Develop
      MF-321—2 baths for 45 sec. +45 sec.
      rinse—DI for 5 min.
   Postbake
      110° C. for 30 min.
   cool—to room temperature
   Metal Etch
      Ni: H$_2$O:HNO$_3$:CH$_3$COOH—4:4:1 (200 ml:200 ml:50 ml), allow to cool (25° C.), immerse for ~15 min. (until discoloration of Ni)
      expose—air for 1.5 min.
      reimmerse—for ~15 min (until cleared)
      rinse—DI for 5 min.
      Ti: H$_2$O:HF—200:1, for ~30 sec. (until cleared)
      rinse—DI for 5 min.
   Strip Photoresist
      Shipley 1165—80° C. for 10 min.
      rinse—DI for 10 min.
      O$_2$ plasma descum 100 W for 2 min.
Optional Integrated Photodiode Steps
   Metal Anneal
      (10.2% H$_2$ in N$_2$) 4.0 l/min for 15 min.
      load—wafers to center of tube
      ramp—to 450° C. (takes ~25 min.)
      stand—at 450° C. for 1 hr.
      turn off heater and set N$_2$ at 4 l/min.
      cool—to room temperature
   Contact and Leakage Tests may be performed on the diodes at this time.
Free Structures
   The following processing sequence may be used to create the free parts (plunger and spring assembly and the mandrel) for the linear magnetic actuator.
Initial Oxidation
   Clean
      NH$_4$OH:H$_2$O$_2$:H$_2$O—1:1:6 in ultrasound for 10 min.
      rinse—DI dilution rinse for 15 min.
      H$_2$SO$_4$—180° C. two baths each for 3 min.
      rinse—DI for 5 min.
      HF:H$_2$O—1:50 for 2 min.
      rinse—DI dilution rinse for 10 min.
      NH$_4$OH:H$_2$O$_2$:H$_2$O—1:1:6 80° C. for 10 min.
      rinse—DI dilution rinse for 20 min.
   Oxidation
      wet—980° C. for 30 min.
   N$_2$ anneal for 15 min.
Sacrificial Layer
   Spin Adhesion Promoter
      Brewer Science APX-K1 at 3 krpm for 30 sec.
      hot plate bake—130° C. for 30 sec.
   Spin Brewer Science PIRL (III) (~5 µm)
      PIRL (III) at 2 krpm for 60 sec.
      edge bead removal—4 krpm 50–60 Sec. (10 sec.)
      hot plate bake
         100° C. for 2 min.
         170° C. for 2 min.
         250° C. for 2 min.

Figure 7:
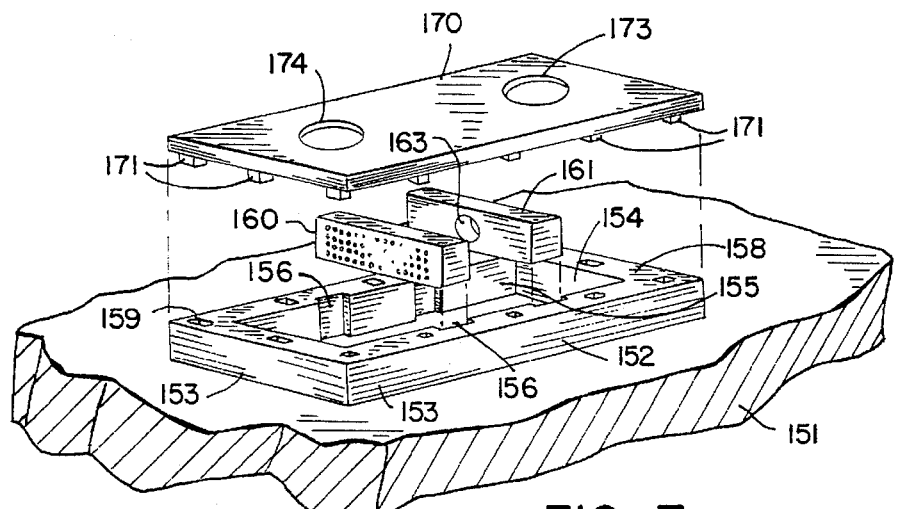
FIG. 7 is an illustrative perspective view of a micromechanical flow control unit formed on a substrate in accordance with the present invention.
Figure 10:
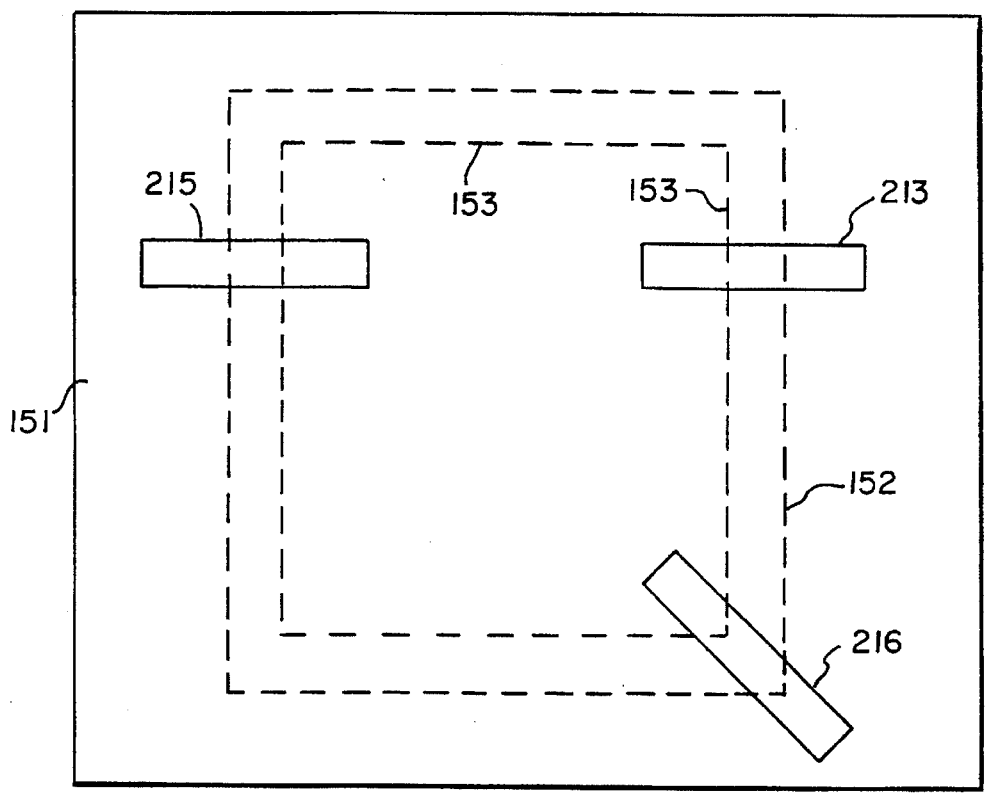
FIG. 10 is an illustrative plan view showing the pattern of electrical crossunders which may be formed in a semiconductor substrate with respect to the flow control units of FIGS. 7–9.

Deposit Plating Base
  Sputter Plating Base CVC
    heat cycle—160° C. for 5 min.
    cool—5 min.
    sputter 200 Å Ti
    sputter 300 Å Cu
    sputter 200 Å Ti
Apply Linear PMMA
  Spin Linear PMMA
    KTI 496K, 9% (filtered)—2 krpm for 30 sec.
  Bake (first)
    ramp—to 180° C. at 1°/min.
    hold—at 180° C. for 1 hr.
    ramp—to 25° C. at 1°/min.
  Spin Linear PMMA
    KTI 496K, 9% (filtered)—2 krpm for 30 sec.
    Bake (second)
    ramp—to 180° C. at 1°/min.
    hold—at 180° C. for 1 hr.
    ramp—to 25° C. at 1°/min.
Attach Sheet PMMA
  Clean Surfaces
    wipe—isopropyl alcohol
  Solvent Bond PMMA
    place clean flat square of sheet PMMA on surface of substrate
    introduce 20–30 μl MMA to edge of interface with micropipette (surface tension should distribute MMA evenly)
    apply pressure to interface for 30 min.
    remove pressure and let stand for 120 min.
  Cut PMMA
  Fly Cutting Procedure
    Cut sheet PMMA to desired thickness (typically ~150 μm)
X-ray Exposure (@ SRC 1GeV beam)
  Align X-ray Mask—3 μm gold pattern on a 1 μm silicon nitride membrane)
  Expose based on PMMA thickness to reach 16,000 J/cm$^3$ at bottom surface of PMMA
Develop PMMA
  Heat PMMA developer and rinse baths to 35° C.
  Developer Cycle 1
    developer—for 3 min.
    first rinse—for 5 min.
    second rinse—for 5 min.
  Developer Cycle 2
    developer for—3 min.
    first rinse for—5 min.
    second rinse—for 5 min.
  Developer Cycle 3
    developer—for 20 min.
    first rinse—for 20 min.
    second rinse—for 20 min.
  Post Develop
    rinse—DI for 10 min.
    air dry
    $O_2$ plasma descum—25 sccm, Δp=20 mT, 50 W for 2 min.
Treat Plating Base
  Plasma Etch Titanium
    $CF_4/O_2$ RIE—10/0.5 sccm, Δp=6 mT, 50 W, for 16 min.
  $CO_2$ Treatment
    saturate in $CO_2$ for 30 min.
    introduce DI and wait for 30 min.
  Cu Activation
    $H_2SO_4$—5% in $H_2O$ for 5 min.
    rinse—DI for 10 min.
Electroplate
  Cu Strike
    about 5 μm Cu electroplated
    rinse—DI for 10 min.
  Cu Activation
    $H_2SO_4$—5% in $H_2O$ for 5 min.
    rinse—DI for 1 min.
  Electroplate NiFe
    plate to final height (just below PMMA surface)
    rinse—DI for 10 min.
Release
  Remove Field PMMA
    DCM—20 min. with agitation (4 hours without agitation)
  Remove Plating Base
    Ti: $H_2O$:HF—200:1, for ~30 sec. (until cleared)
      rinse—DI for 5 min.
    Cu: $H_2O$:$NH_4OH$—3:1, for ~15 min. (until cleared)
      rinse—DI for 5 min.
    Ti: $H_2O$:HF—200:1, for ~30 sec. (until cleared)
      rinse—DI for 5 min.
  Sacrificial Etch
    $H_2O$:$NH_4OH$—3:1, for 3–4 hours (until structures are free) may be performed overnight and heated to ~40° C.; solution should be replaced every hour if possible
    dilution rinse—DI for 10 min.
    dilution rinse—isopropyl alcohol
    filter structures out of solution and allow to air dry
Magnetic Circuit
  The following describes the processing sequence for the magnetic circuit fixed to the substrate in the actuator of FIG. 1.
Initial Oxidation
  Clean (C-2)
    $NH_4OH$:$H_2O_2$:$H_2O$—1:1:6 in ultrasound for 10 min.
    rinse—DI dilution rinse for 15 min.
    $H_2SO_4$—180° C. two baths each for 3 min.
    rinse—DI for 5 min.
    HF:$H_2O$—1:50 for 2 min.
    rinse—DI dilution rinse for 10 min.
    $NH_4OH$:$H_2O_2$:$H_2O$—1:1:6 80° C. for 10 min.
    rinse—DI dilution rinse for 20 min.
  Oxidation
    wet—1050° C. for 70 min. (5000 Å)
    $N_2$ anneal for 15 min.
Deposit Plating Base
  Sputter Plating Base CVC
    heat cycle—160° C. for 5 min.
    cool—5 min.
    sputter 200 Å Ti
    sputter 300 Å Cu
    sputter 200 Å Ti
  Apply Linear PMMA
    Spin Linear PMMA (first layer)
    KTI 496K, 9% (filtered)—2 krpm for 30 sec.
    Bake
    ramp—to 180° C. at 1°/min.

hold—at 180° C. for 1 hr.
ramp—to 25° C. at 1°/min.
Spin Linear PMMA (second layer)
KTI 496K, 9% (filtered)—2 krpm for 30 sec.
Bake
ramp—to 180° C. at 1°/min.
hold—at 180° C. for 1 hr.
ramp—to 25° C. at 1°/min.
Attach Sheet PMMA
Clean Surfaces
wipe—isopropyl alcohol
Solvent Bond Sheet PMMA
place clean flat piece of sheet PMMA on surface of substrate
introduce 20–30 μl MMA to edge of interface with micropipette (surface tension should distribute MMA evenly across interface)
apply pressure to interface for 30 min.
remove pressure and let stand for 120 min.
Cut PMMA
Fly Cutting Procedure
Cut sheet PMMA to desired thickness (typically ~250 μm)
X-ray Exposure (@ SRC 1 GeV beam) Align X-ray Mask—3 μm gold pattern on a silicon
nitride membrane
Expose based on PMMA thickness (16,000 J/cm$^3$ for 250 μm PMMA)
Develop PMMA
Heat PMMA developer and rinse baths to 35° C.
Developer Cycle 1
developer—for 3 min.
first rinse—for 5 min.
second rinse—for 5 min.
Developer Cycle 2
developer—for 3 min.
first rinse—for 5 min.
second rinse—for 5 min.
Developer Cycle 3
developer—for 20 min.
first rinse—for 20 min.
second rinse—for 20 min.
Post Develop
rinse—DI for 10 min.
air dry
$O_2$ plasma—25 sccm, Δp=20 mT, 50 W for 2 min.
Treat Plating Base
Plasma Etch Titanium
$CF_4/O_2$ RIE—10/0.5 sccm, Δp=6 mT, 50 W for 8 min. (+8 min.; until Cu is clear)
Mask Conductive Surfaces
tape all conductive surfaces that should not be plated (including backside of substrate if necessary)
Clip Contact
scratch away a small area of linear PMMA on the edge of the wafer to expose plating base allowing electrical contact to the cathode clip
$CO_2$ Treatment
saturate in $CO_2$ for 30 min.
introduce DI and wait for 30 min. (surface must remain wet until completion of the plating process)
Cu Activation
$H_2SO_4$—5% in $H_2O$ for 5 min.
rinse—DI for 1 min.
Electroplate
Cu Strike
about 5 μm/min. Cu electroplated
rinse—DI for 10 min.
Cu Activation
$H_2SO_4$—5% in $H_2O$ for 5 min.
rinse—DI for 1 min.
Electroplate NiFe
plate to final height (just below PMMA surface)
rinse—DI for 10 min.
Dice Substrate
Remove Field PMMA
Etch PMMA
DCM—20 min. with agitation (4 hours without agitation)
air dry
1165 (optional)—80° C. for 10 min.
rinse (after 1165)—DI for 10 min.
Package
Clean chip and package surfaces with isopropyl alcohol
Glue mount chip on package
Remove Plating Base
Ti:
$H_2O$:HF—200:1, for ~30 sec. (until cleared)
rinse—DI for 5 min.
Cu: $H_2O$:$NH_4OH$—3:1, for ~15 sec. (until cleared)
rinse—DI for 5 min.
Ti: $H_2O$:HF—200:1, for ~30 sec. (until cleared) rinse—DI for 5 min.
Assemble Free Structures to Structures on Substrate The present invention also encompasses micromechanical fluid control components which are adapted to use micromechanical actuators in accordance with the present invention. An exemplary fluid control component in accordance with the present invention is shown at 150 in FIG. 7 formed on a substrate 151, which may comprise solid metal, single crystal silicon, a layer of silicon dioxide on single crystal silicon, polycrystalline silicon, glasses, ceramics, metals, and so forth, and it is generally preferable that the materials not be ferromagnetic. Preferably, the substrate 151 is formed of a semiconductor such as single crystal silicon to allow the formation of microelectrical devices on the substrate which can be integrated with the operation of the fluid control structures. A particular advantage of the present invention is that the processing utilized to form the micromechanical structures is compatible with standard microelectronic processing. The exemplary fluid control structure 150 shown in FIG. 7 comprises a metal frame 152 formed by photolithographic techniques, as described in further detail below, which has an upright wall 153—which may be rectangular as shown—and interior wall surfaces 154 and 155. The opposed interior wall surfaces 155 preferably have slots 156 formed therein which are adapted to have the ends of panels 160 and 161 inserted therein to form dividing walls to divide the interior space within the frame 152 into plural chambers. For exemplification, the panel 160 has a plurality of openings therethrough which function as a diffuser element, and the panel 161 has a single opening 163 therein, forming a flow control orifice. The panels 160 and 161 are also preferably formed of metal by precision photolithographic methods in accordance with the present invention. A metal cover 170 is adapted to be secured to the top surface 158 of the frame 152, and has downwardly descending pegs 171 which are adapted to fit into openings 159 in the top surface 158 of the frame to hold the cover 170 in place. The cover 170 preferably has an inlet opening 173 and an outlet opening 174 formed therein, with the inlet opening in communication with a chamber on one side of the dividing wall panels, e.g., the panel 161, and with the outlet opening 174 in communication with another chamber which is separated by one or more of the dividing wall panels, e.g., the panels 160 and 161, from the chamber with which the inlet opening 173 is in communication. For purposes of illustration, the panels 160 and 161 and the top cover 170 are shown in an exploded view in FIG. 10 spaced away from the frame 152. The cover 170 is secured to the frame 152 to provide a fluid-tight (e.g., liquid or gas-tight) seal between the two, such as by use of adhesives, heat bonding, ultrasonic bonding, electric welding, etc.

Communication of fluid to and from the openings 173 and 174 in the cover 170 of the assembled fluid control unit 150 can be accomplished in various ways, for example, by connecting tubes or micropipes connected to the openings 173 and 174, or by fitting a microchannel plate having openings therein which coincide with the openings 173 and 174 to provide communication therebetween. Further, an array of the units 150 may be applied to a substrate, with the appropriate dividing wall panels assembled to specific units within the array to provide a desired function within each unit, and with the units being interconnected to provide a complete system of fluid control components.

Figure 8:
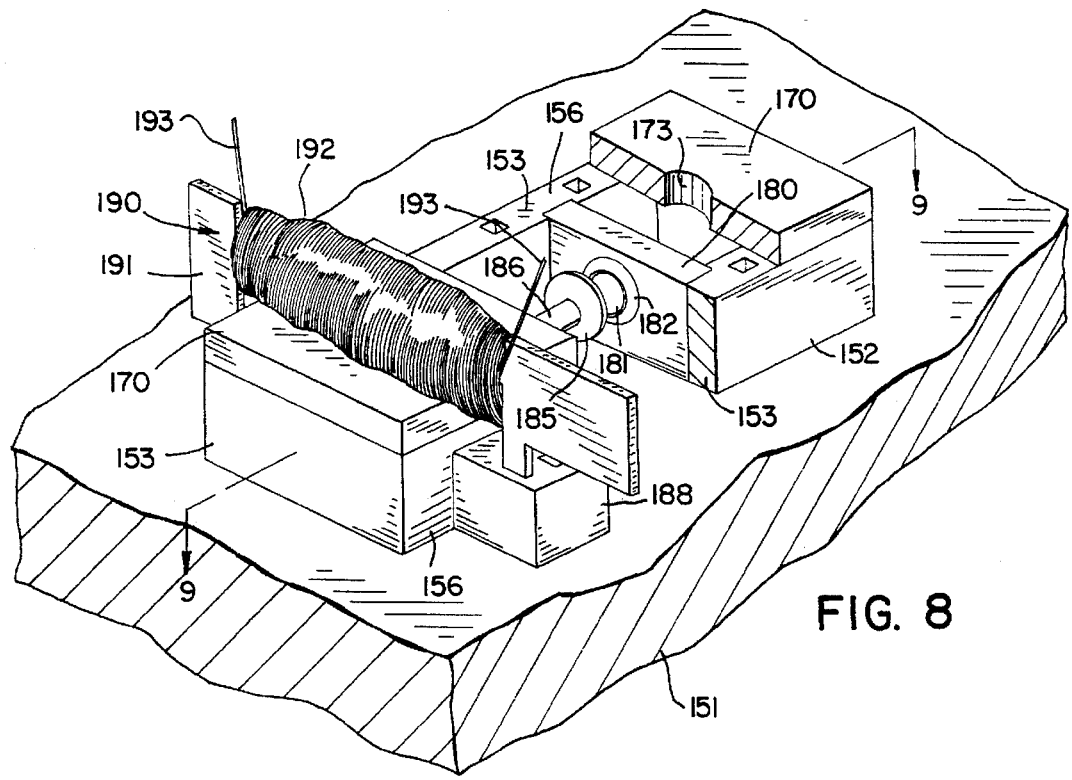
FIG. 8 is an illustrative perspective view of a micromechanical actuator flow control unit formed on a substrate in accordance with the invention.
Figure 9:
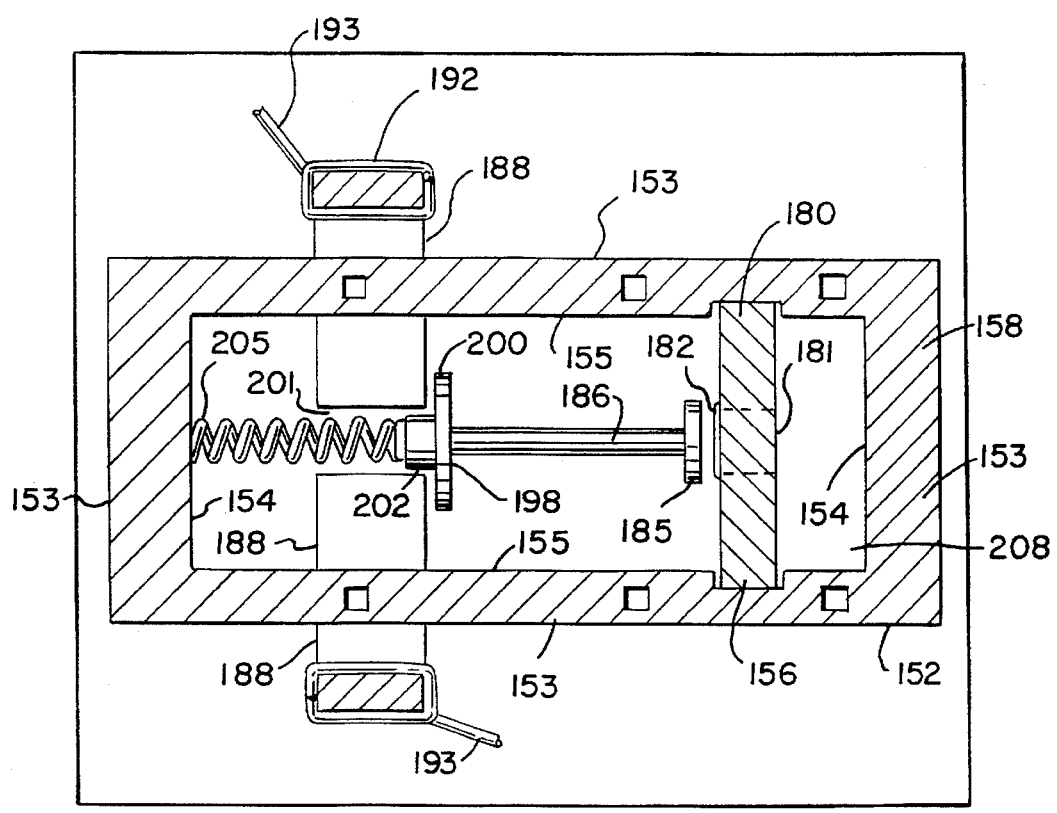
FIG. 9 is a cross-sectional view through the actuator of FIG. 8 taken generally along the lines 9—9 of FIG. 8.

In accordance with the present invention the micromechanical actuator of the present invention may be integrated into fluid control components. Such a structure is illustrated in FIG. 8, in which a panel 180 forming a dividing wall within the frame 152 of a fluid control unit has an orifice opening 181 therein with a valve seal 182 formed around the opening 181. An opening in the cover 170 (e.g., the opening 173 partially shown in FIG. 8) is in communication with the chamber within the fluid control unit formed on one side of the dividing wall panel 180. On the other side of the dividing wall panel 180 is a plunger type control valve having a head 185 mounted on a stem 186 which is adapted to be advanced toward and to engage against the seal 182 to close the opening 181. The actuator for the valve is formed as described above with the respect to the actuator 40 of FIG. 1, with a section of magnetic core 188 formed on and fixed to the substrate 151, and extending through the sidewalls 153, as best shown in FIG. 9. A separately formed coil section 190 includes a mandrel 191 about which a coil of wire 192 is wound, with the ends 193 of the wire extending away from the coil to connection to a power supply. The coil section 190 may be formed in the same manner as the coil section 45 of FIG. 1. The mandrel 191 has downwardly extending pegs (not shown) similar to the pegs 48 of the mandrel 46, which fit into receptacle openings (not shown) in the fixed core 188 in a manner similar to the way in which the mandrel is mounted to the fixed portion of the core 44 in the actuator of FIG. 1.

As illustrated in FIG. 9, the valve includes an actuator plunger 198 to which the stem 186 is integrally mounted, with an expanded flange portion 200 of the plunger extending outwardly from the gap formed between the end walls 201 of the magnetic core segments 188. A back section 202 of the plunger 198 extends backwardly from the flange 200 into the gap between the end walls 201, and a spring 205 is mounted between the inner wall 154 and the end of the plunger section 202 and is in compression to urge the plunger outwardly and normally press the valve head 185 into engagement with the valve seal 182 to close the orifice 181. When current is supplied to the coil 192 through the end wires 193, the plunger 198 is drawn toward the magnetic core 188, thereby drawing the valve head 185 away from the valve seal 182 and allowing fluid (liquid or gas) to flow from the chamber 208, defined between the panel 180 and the end wall 154, to the chamber 209 on the other side of the end wall 180. Although not shown in FIGS. 11 and 12, an additional opening 174 is formed in the top cover 170 to be in communication with the chamber which is defined on the side of the wall panel 180 which contains the valve head 185. It is seen that because the cover 170 is sealed to the frame 152, and the coil 192 is mounted to the mandrel at a position entirely outside of the sealed flow control unit defined within the frame 152 between the substrate 151 and the top cover 170, no electrical connection need be made to any components within the unit which may be in contact with the flowing fluid.

The walls 153 of the frame 152 are preferably formed of a nonmagnetic metal, such as copper, while the fixed core 188 is formed of ferromagnetic metal, such as nickel-iron permalloy as described above. The permalloy fixed core 188 may be formed first on the substrate by an electrodeposition process and then the metal defining the walls 153 may be deposited over it such that a complete fluid tight seal is formed at the joint between the walls 153 and the core metal 188. Because the walls 153 are formed of a nonmagnetic metal, flux is not diverted from the fixed core 188 to the walls 153.

Figure 11:
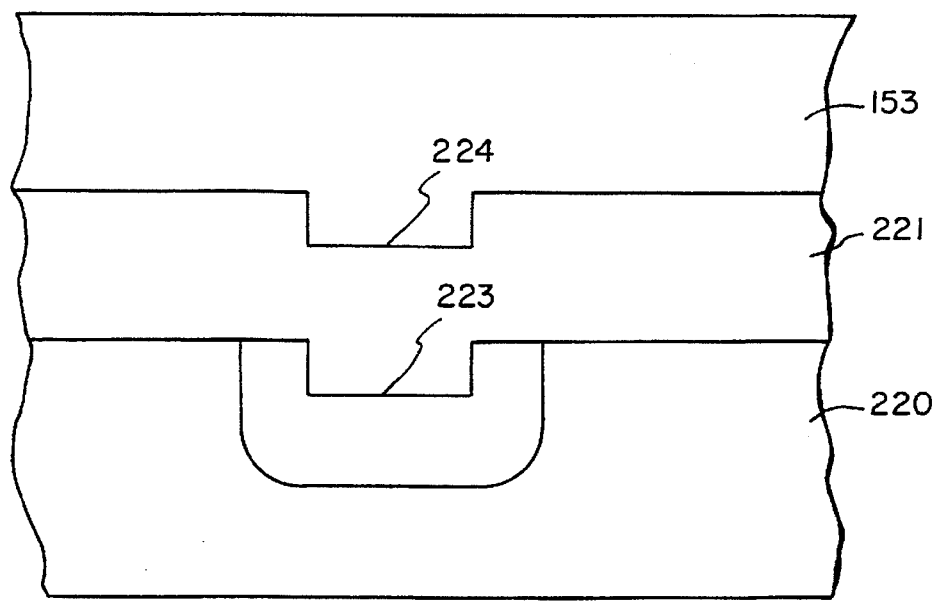
FIG. 11 is an illustrative cross-sectional view through a wall of a flow control unit in accordance with the invention on a substrate showing conductive channels formed in the substrate by doping of the semiconductor substrate.

An exemplary process for producing the unitary fluid control structures 150 is set forth below for illustrative purposes. In this exemplary process, the substrate 151 is processed before formation of the flow control structures to provide, if desired, conducting paths in the substrate which cross from the interior of the frame to the exterior. Such crossunder conducting paths are illustrated at 215 in FIG. 10, in which the conducting paths cross under and are perpendicular to the side walls 53, and at 216 wherein the conducting path crosses under a corner of the frame. Such conducting paths may be formed in various substrates. For example, where the substrate 151 comprises silicon on insulator, the conducting paths can be formed by doping the silicon entirely, patterning the silicon to form the conducting paths 215 and 216, oxidizing the silicon to provide an insulating layer over the silicon, opening the oxide over contacts to the silicon conducting strips 215 and 216 at their termini, and metalizing the contacts to provide a convenient connection to exterior circuitry. Another way of forming the conducting paths is illustrated in FIG. 11, which shows a cross section through a normal silicon substrate 220. The substrate is first oxidized and patterned in the desired conducting paths, the opened areas are doped opposite to the substrate, an oxidation and diffusion step is then carried out, contact areas are opened through the oxide to the doped silicon conducting paths, and the opened areas are metalized to allow contact to outside connectors.

The frame of the flow control element may have an arbitrary shape in cross section, including designs which are square, round, polygonal, etc. The frames serve several purposes, including a seal to the substrate, a support for the cover, mechanical support for assembled parts within the frame, optional provision of integrally formed flow control elements, and may include both magnetic and non-magnetic materials as part of the integral structure of the frame. The flat pack flow control unit is produced by high aspect ratio lithography and metal plating or injection molding and metal plating.

Figure 12:
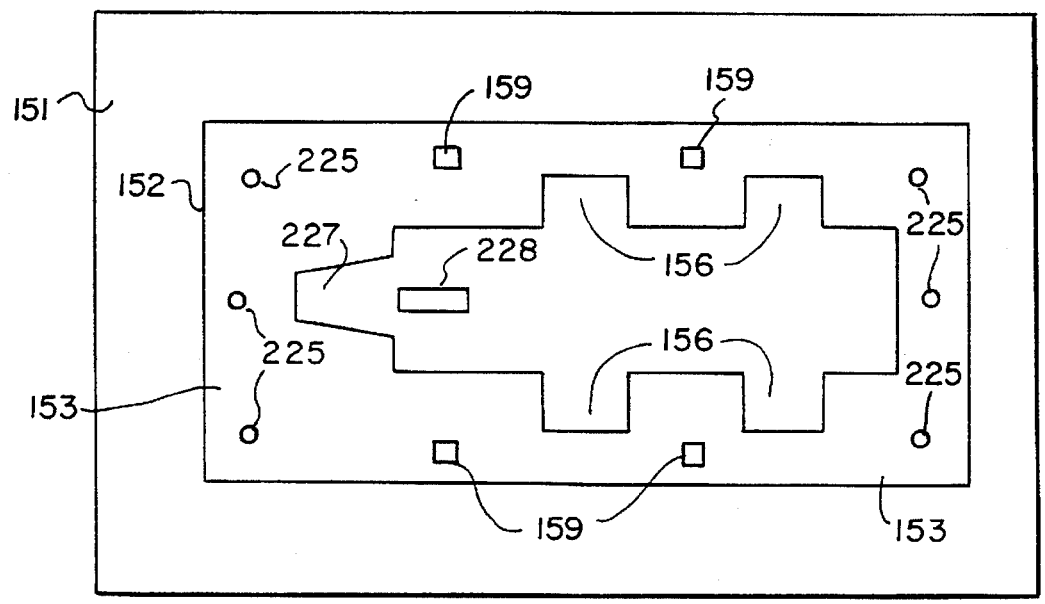
FIG. 12 is an illustrative plan view of a frame structure for a flow control unit in accordance with the present invention.
Figure 13:
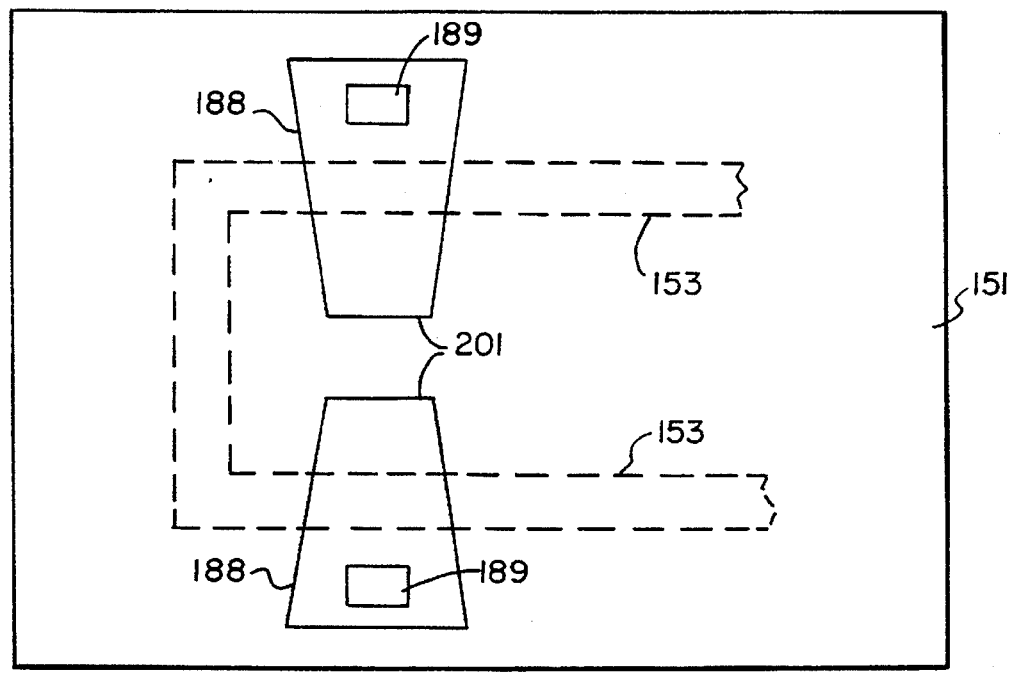
FIG. 13 is a plan view illustrating a step in the formation of the metal structures fixed to the substrate in the micromechanical flow control actuator of FIG. 8.

FIG. 12 shows a plan view of another form of the frame 152 formed on a substrate 151. In this case, the frame 152 includes both posts 225 which extend up from the top surface 158 and the holes 159 which extend downwardly from the top surface 158. Slots 156 are formed in the side walls to accept wall divider panels. A recess 227 may be formed in one of the end walls to provide a flow guide for flow to an opening in the top cover above the recess 127, and an upright flow divider 228 may be formed extending upwardly from the substrate 151 adjacent to the recess 227 to help guide the flow to the recess and/or support the plunger of the actuator. This is understood to be one example of the various forms that the interior structure in the frame may assume for particular applications.

After the plating of the metal (e.g., copper) to form the frame walls 153, the height of the frame 152 above the substrate can be selected by machining down the top surface of the frame with a fly cutter as described above, which also produces a substantially flat top surface 158 of the frame.

Figure 16:
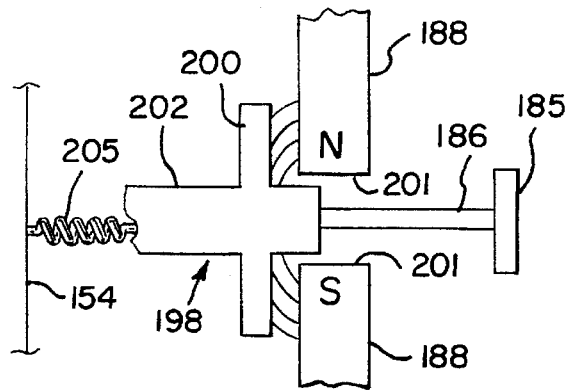

The formation of the fixed frame walls 153 and the fixed core sections 188 is illustrated with reference to FIG. 16. The first step involves the application of a plating base to the surface of the substrate 151. Several plating bases are available for such processing, including thin layers of titanium, copper and titanium, or titanium and nickel, with each layer a few hundred angstroms thick. These plating bases are applied as described above with respect to the formation of the actuator structures. A photoresist is then applied and an X-ray exposure is made with a first mask to define, for example, the fixed magnetic core section 188. The first metal, e.g., nickel-iron permalloy, is plated into the exposed areas of the photoresist to define the fixed magnetic core sections 188. Thereafter, the top surface of the core sections 188 is planerized by milling using a fly cutter, with subsequent grinding and polishing. As noted above, the second deposited metal forming the walls 153 of the frame is deposited over the first deposited metal defining the magnetic core sections 188. It is preferred that the metal defining the frame walls 153 be nonmagnetic, e.g., copper. For some patterns of frame walls, it may be necessary to apply a second plating base. This plating base would be applied to the planerized surface of the first metal defining the fixed magnetic core sections 188. A second photoresist is then applied to the surface of the substrate and over the previously applied metal sections 188, exposed in a pattern using a second mask which is properly aligned to the structures previously formed on the substrate, and the exposed photoresist removed. The second metal, e.g., copper, is then plated to form the walls 153 of the frame. These walls are planerized by milling with a fly cutter, ground and polished. If upright posts (e.g., the posts 225 shown in FIG. 12) are to be formed on the upper surface 158 of the frame, a third photoresist is applied and a third mask is aligned, with subsequent exposure through the mask to form the post patterns in the photoresist, removal of the exposed photoresist, and electroplating of the metal of the posts into the post areas defined by the photoresist.

The insert panels which fit into the interior of the frame can be passive devices without moving parts which are used for flow control and diagnostics, and active devices which have moving parts. Devices without motion may in part be electronic, such as pressure transducers, hot wire anemometers, etc. They may also be metal structures which are either fabricated as part of the frame (e.g., a venturi), or such structures may be fabricated separately from the frame and assembled into the frame. Typical of such parts are orifice plates, flow straighteners, and valve seats and valve and pump parts.

The processing procedure for forming the free metal structures in accordance with the invention utilizes lithographic techniques with metal deposition on a sacrificial layer. The metal structures are overplated on to a plating base and replanerized by milling, e.g., as described in U.S. Pat. No. 5,190,637, and then freed from the substrate utilizing sacrificial layer techniques, e.g., as described in U.S. Pat. No. 5,189,777. After being freed from the substrate, the panels defining the walls for the flow control units are then assembled into the slots in the frame. Where the structures are formed utilizing sacrificial layers, they may be planerized, and then a second photoresist and second mask used to define a second metal layer. The second mask may utilize an optical photoresist to define a pattern for a thin layer of a second metal to be deposited upon the first. Examples of such multilayer metal structures are shown in U.S. Pat. No. 5,190,637. The second metal may be formed of a soft metal, e.g., silver or gold, for various purposes. For example, in the panel forming a side wall 180 shown in FIG. 14, an orifice 181 in the center of the panel has a layer of soft metal 182 formed around it to define a valve seat seal, for the purpose as described above with respect to FIG. 8 to allow sealing of the valve head 185 against the valve seat 182 to close the orifice 181. Thin layers 230 of soft metal, such as silver or gold, are formed on each face of the panel 180 near the side edges 235 to provide bonding between the inserted panel 180 and the walls of the slots 156 formed in the side walls of the frame. As the panels 180 are being inserted into the slots, the soft metal 230 may engage tightly against the walls of the slot and deform to provide a tight seal at the walls to prevent leakage between the panels and the walls of the slot. The valve seat 182 may also be provided by a lithographically defined polymer if appropriate given the expected operating temperatures and fluid being controlled.

Figure 14:
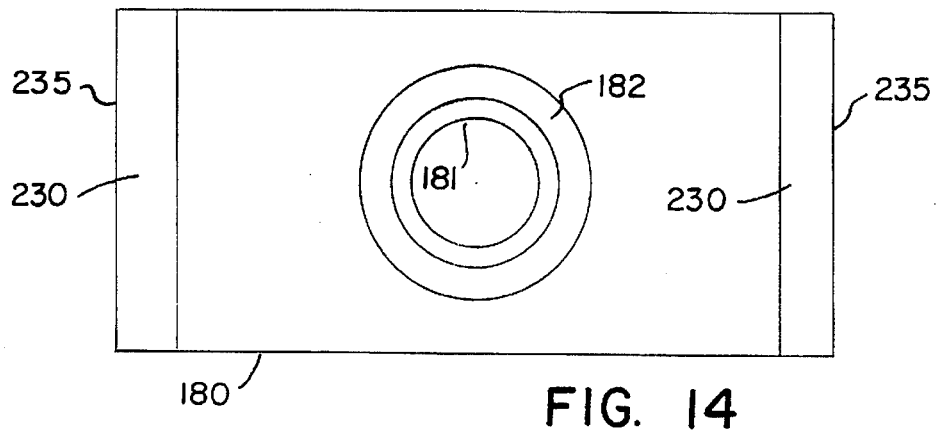
FIG. 14 is an elevation view of an illustrative dividing wall providing a valve orifice and valve seat which can be used with the flow control actuators of FIGS. 8–9.
Figure 15:
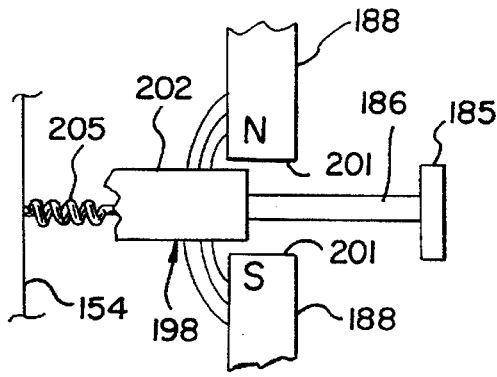
FIGS. 15 and 16 are simplified plan views of alternative actuator plungers which may be utilized in the flow control unit of FIGS. 8–9.

In addition to the normally closed valve actuator shown in FIGS. 8 and 9, normally open valves may also be utilized in accordance with the present invention. Examples are illustrated in FIG. 14, in which the spring 205 is in tension rather than compression, and application of a magnetic field in the gap between the faces 201 of the magnetic core pieces 188 draws the movable plunger section 202 into the gap against the tension of the spring 205 to drive the valve head 185 into contact with the valve seat. Additional force, with a limited throw, is obtainable with the structure of FIG. 16 wherein a flange 200 is formed on the plunger section 202 to provide additional draw force of the plunger when the core pieces 188 are magnetized. The preloading of the spring 205, either in tension or compression, is provided during assembly of the valve.

Figure 17:
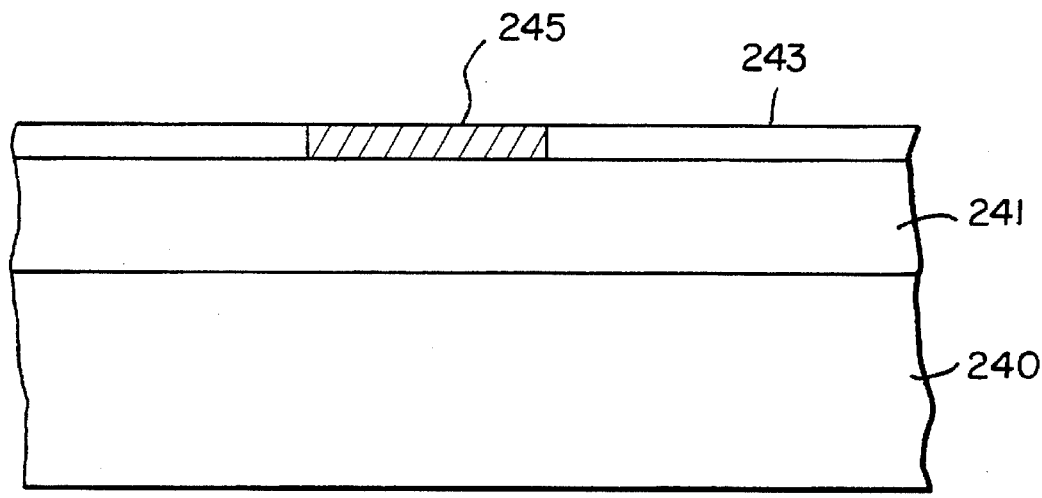
FIG. 17 is a simplified cross-sectional view of structures formed in a substrate in an intermediate step for forming a diaphragm for use in a diaphragm pump.
Figure 18:
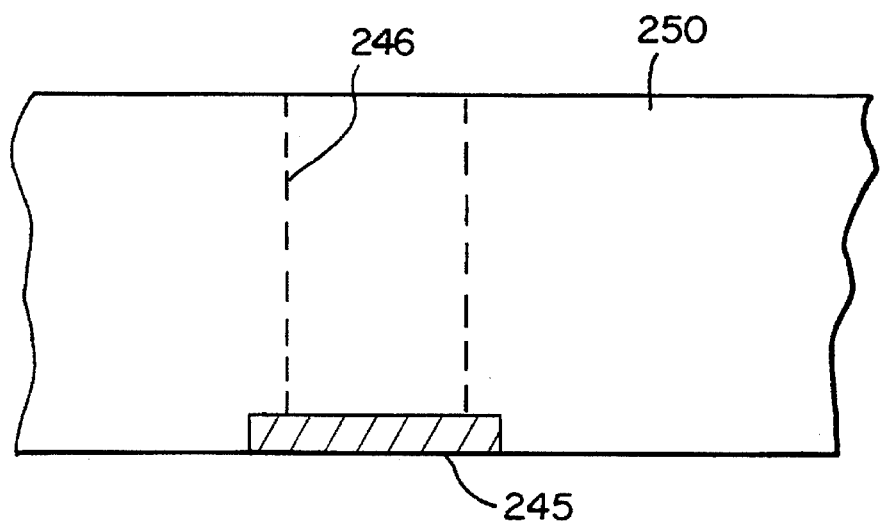
FIG. 18 is a simplified partial cross-sectional view of a flow control panel wall which may be inserted in a flow control unit in accordance with the invention with the diaphragm of FIG. 17 assembled therein.

It is also apparent that variations of these structures are possible. For example, valves may be constructed which have a continuous range of opening to function as servo control valves, for example, utilizing conventional spool valve structures. Further, valves may be constructed utilizing diaphragms to which the actuator plunger is connected. The diaphragm may be operated rapidly and periodically to provide a pumping action, utilizing one-way valves on the input and output to provide a diaphragm pump. Such devices have the advantage that the plunger which drives the diaphragm is not in contact with the fluid which is being pumped. Fabrication of such diaphragms may be carried out using conventional processing techniques. For example, with reference to FIGS. 17 and 18, a substrate 240 (e.g., silicon, etc.) may be prepared with a sacrificial layer 241 formed thereon (e.g., copper) and a photoresist layer (e.g., PMMA) 243 is applied over the sacrificial layer 241. The photoresist layer 243 is then patterned by exposure to X-rays and dissolving of the exposed photoresist to leave an opening to the sacrificial layer 241 within which a diaphragm metal (e.g., nickel/iron) is plated, as illustrated by the diaphragm 245 in FIG. 17. The surface of the diaphragm 245 may be planerized by milling, grinding and polishing as described above. The diaphragm 245 may then be removed from the sacrificial layer 241 by dissolving the sacrificial layer in an etchant which does not affect the metal of the diaphragm 245.

After the diaphragm 245 is formed and freed from the sacrificial layer 241, it may be inserted in an appropriately sized opening formed in a dividing wall panel 250 formed in the matter described above. The opening in which the diaphragm 245 is inserted, and a passageway 246 through the panel 250, can be formed as part of the formation of the dividing layer 250.

The formation of the cover 170 is also preferably carried out using sacrificial layer lithographic and electro-deposition techniques as described above. The primary functions of the cover are to seal the interior of the flow control unit from the exterior ambient and to seal the chambers within the interior from one another. It may also be utilized to provide input and output flow connections through the openings 173 and 174, or further openings, if desired. As noted above, openings may also be provided in the side walls and in the substrate to allow communications with the interior chambers. The tabs or posts 171 may be formed after the formation of the cover by applying a photoresist to a formed plate while it is joined to a substrate, exposing the photoresist in a pattern to define the tabs, removing the exposed photoresist and electro-depositing metal into the opened areas to form the tabs.

Figure 20:
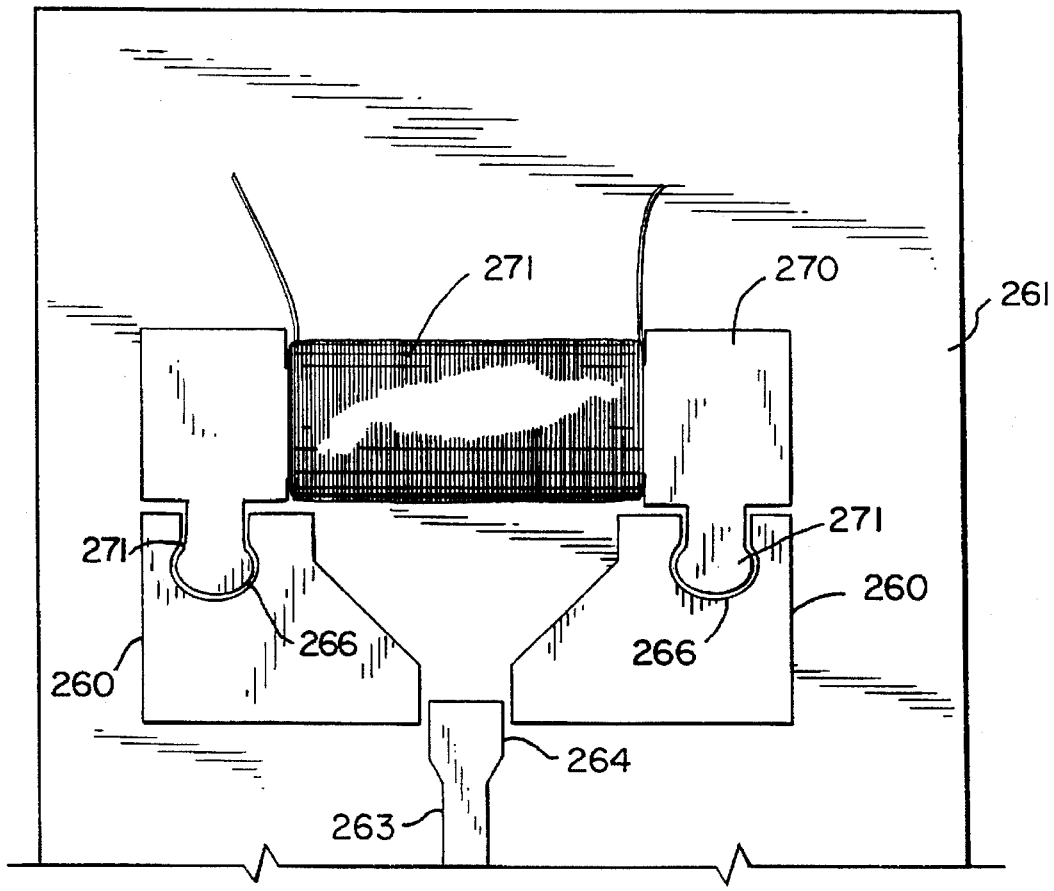
FIG. 20 is a plan view of another mating structure which may be utilized to engage the mandrel and coil to the fixed magnetic core.

It will be apparent that various mating structures may be used to engage the mandrel and coil to the fixed core. An example of an alternative mating structure is shown with reference to FIG. 20, in which fixed core sections 260 are formed on a substrate as described above. A plunger 263 having a magnetic head 264 is partially shown in FIG. 20. The fixed core sections have vertical notches 266 formed therein. A mandrel 270 having a coil 271 around therein has protrusions 271 extending from the ends of the mandrel which are shaped to fit in the notches 266. Other mortise and tenon joints or other mating structures may be utilized as desired.

Figure 21:
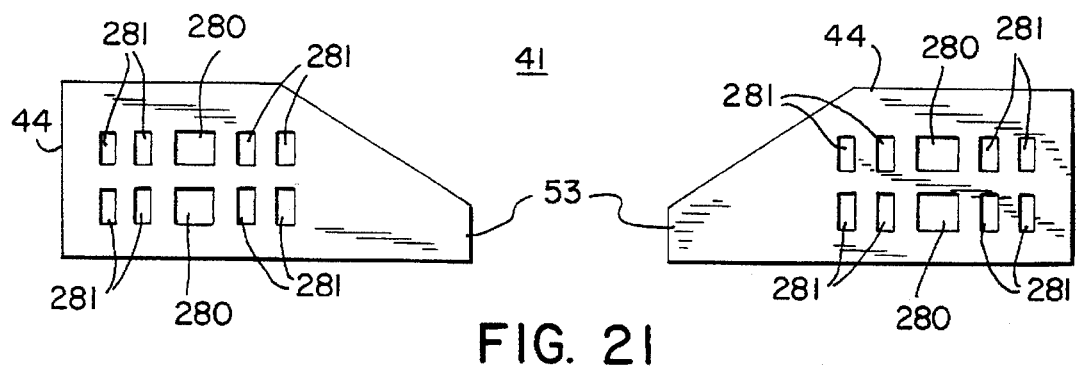
FIG. 21 is an illustrative plan view of another fixed magnetic core structure fixed to a substrate.
Figure 22:
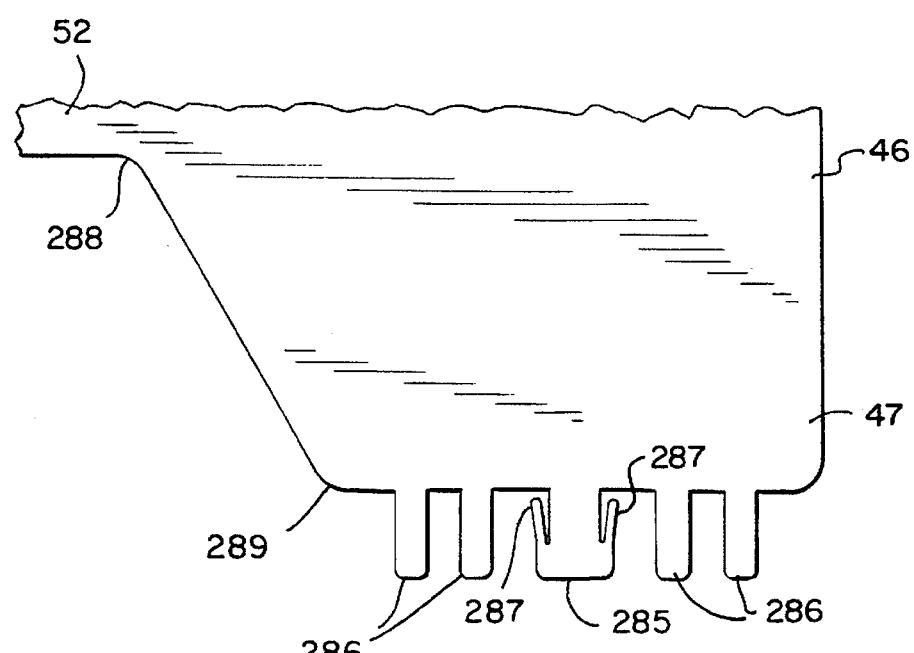
FIG. 22 is a partial side view of a mandrel adapted to mount to the fixed magnetic core structure of FIG. 21.

A variation of the mating mandrel and fixed core structures of FIGS. 5 and 6 is shown in FIGS. 21 and 22. The fixed core sections 44 are formed on the substrate 41 as described above but each core section has multiple receptacle openings forming a set for each mandrel, including a central (preferably square) receptacle opening 280 and smaller side receptacle openings 281. For illustration, two sets of the openings 280 and 281 are shown in each of the fixed sections 44, although it is understood that only one set or more than two may be provided as desired. The mandrel 46, partially shown in FIG. 22, which mounts to the fixed core sections of FIG. 21 has a central peg 285, adapted to fit into the central recptacle opening 280, and smaller side pegs 286 which are adapted to fit into the side openings 281. The central peg 285 has outwardly extending clips 287 formed thereon which are compressed inwardly when the peg 285 is inserted into the central opening 280. The clips 287 serve to help hold the mandrel 44 firmly in place once it is assembled to the fixed core sections 44, and the insertion of the side pegs 286 into the side openings 281 also helps hold the mandrel firmly in place and provides a larger area for joining the magnetic flux from the mandrel 46 to the core sections 44. The inner corners 288 and 289 between the end sections 47 and the central core 52 of the mandrel may be rounded as shown in FIG. 22 to facilitate winding of the coil 50 onto the core 52, since the rounded corners will not catch the wire and will help guide the wire into place.

It is understood that the invention is not limited to the particular embodiments set forth herein as illustrative, but embraces such modified forms thereof as come within the scope of the following claims.

What is claimed is:

1. A micromechanical linear actuator comprising:

(a) a nonferromagnetic substrate having a top surface;

(b) a fixed magnetic core on the substrate top surface, the magnetic core having end faces spaced apart to define a gap in the core, the core formed by electrodeposition of a ferromagnetic material onto the surface of the substrate;

(c) a plunger having a magnetic head, at least the head of the plunger formed of a magnetic material;

(d) means for supporting the plunger for linear movement such that the head of the plunger can move toward and away from the gap in the fixed core; and (e) a coil of electrical conductor coupled to the fixed magnetic core to provide magnetic flux therethrough when the coil is supplied with electrical current such that the head of the plunger is magnetically actuated when the coil is supplied with current, wherein the coil is wound around a mandrel formed of ferromagnetic material, the mandrel having end sections on either side of the coil, the end sections of the mandrel and the fixed core having mating structures which are engaged together to mount the mandrel and coil to the fixed core to complete a magnetic flux circuit through the mandrel, the fixed core, and the gap in the fixed core.

2. The actuator of claim 1 wherein the means for supporting the plunger comprises a spring integrally formed with the plunger, the spring mounted to the substrate to suspend the plunger for linear movement and the spring biasing the plunger such that the plunger head is out of the gap when no current is supplied to the coil and wherein the head of the plunger is drawn into the gap against the force of the spring when current is supplied to the coil.

3. The actuator of claim 2 wherein the spring includes mounting sections mounted to the substrate, straight leaf sections extending outwardly from the mounting sections, an outward end section to which the leaf sections are joined, and straight leaf sections extending inwardly from the end sections to join to a plunger body on which the plunger head is formed, the mounting sections, straight leaf sections, end sections, plunger body, and plunger head formed integrally of ferromagnetic material.

4. The actuator of claim 1 wherein the fixed core and the plunger head are formed of permalloy.

5. The actuator of claim 1 wherein the substrate comprises crystalline silicon, the substrate having electronic devices formed therein which are coupled to the actuator coil to be affected by the movement of the plunger.

6. The actuator of claim 5 wherein the electronic devices formed in the substrate include photodiodes formed adjacent to the plunger, the plunger having shutter sections extending therefrom positioned to alternately cover and uncover the photodiodes formed in the substrate beneath the shutter sections as the plunger moves parallel to the substrate, whereby when light is projected downwardly onto the plunger the output of the photodiodes on the substrate will be affected by the position of the plunger as the shutter section alternately blocks and permits the passage of light to the photodiodes as the plunger moves linearly.

7. The actuator of claim 1 wherein the fixed core is formed in two separate sections on the substrate on each side of the gap in the core, the top surface of each core section being substantially planar and wherein the mating structure on the core comprises an opening in the top surface defining a receptacle in each core section, wherein the mating structure on the mandrel comprises a peg extending from each end section on each side of the coil, the pegs adapted to fit into the receptacle openings in the fixed core, the mandrel and coil mounted to the fixed core by insertion of the pegs on the mandrel into the receptacle openings in the fixed core sections to complete a magnetic flux circuit through the mandrel, the fixed core sections, and the gap between the fixed core sections.

8. The actuator of claim 1 including an electrical switch coupled to the plunger to be opened and closed by the plunger.

9. The actuator of claim 1 wherein the plunger has an elongated plunger body, the head formed at one end of the body, and outwardly extending contact flanges formed at the other end of the elongated body, and further including two electrical conductor sections formed on the substrate having ends which terminate adjacent to the contact flanges on either side of the elongated plunger body and positioned to be normally out of contact with the flange when the plunger is not actuated and to be contacted by the flange to provide electrical continuity between the two electrical conductor sections when the actuator is actuated by providing current to the coil, thereby to control the flow of current through the electrical conductor contact sections.

10. The actuator of claim 1 further including a frame defined by a frame wall of nonferromagnetic material formed by electrodeposition on the substrate, the frame wall surrounding the actuator plunger and formed over and in contact with the fixed magnetic core, the coil mounted by the mating structure to the fixed magnetic core at a position outside of the frame.

11. The actuator of claim 10 further including a cover of nonferromagnetic material joined over the frame to close off the interior of the frame as a chamber within which the plunger is contained.

12. The actuator of claim 11 further including an elongated rod extending from the plunger body in a direction aligned with the direction of motion of the plunger body and a valve head mounted on the end of the rod, the valve head having a face for sealing against an orifice when the actuator is actuated by supplying current to the coil.

13. The actuator of claim 10 wherein the magnetic core is formed of ferromagnetic metal and the walls of the frame are formed of copper.

14. The actuator of claim 1 wherein the plunger comprises an elongated plunger body, the head formed at the end of the plunger body to extend into the gap in the fixed core, and the head further including a flange of ferromagnetic material formed on the plunger body extending outwardly from the plunger body on each side of the plunger body, the core having walls adjacent to the gap which are substantially parallel to the flange on the plunger body, wherein when electrical current is provided to the coil, a magnetic flux path is formed between the portions of the fixed magnetic core adjacent to the faces defining the gap through the flange on the plunger body from the core on one side of the gap to the core on the other side of the gap.

15. The actuator of claim 1 wherein the magnetic core fixed to the substrate has a height of about 2 mm or less.

16. The actuator of claim 1 wherein the fixed core is formed in two separate sections on the substrate on each side of the gap in the core, the top surface of each core section being substantially planar and wherein the mating structure on the core comprises at least two openings defining receptacles in each core section, wherein the mating structure on the mandrel comprises a peg extending from each end section on each side of the coil, the pegs adapted to fit into the receptacle openings in the fixed core, the mandrel and coil mounted to the fixed core by insertion of the pegs on the mandrel into the receptacle openings in the fixed core sections to complete a magnetic flux circuit through the mandrel, the fixed core sections and the gap between the fixed core sections, wherein at least one additional mandrel and coil may be mounted to the fixed core sections by insertion of the pegs on the mandrels into the receptacles in the fixed core sections.

17. A micromechanical fluid control unit comprising:
(a) a substrate having a substantially planar top surface;
(b) a metal frame formed by electrodeposition on the top surface of the substrate, the frame formed by a frame wall which surrounds a central cavity, the frame wall having at least two opposed inner wall surfaces having slots formed therein which extend perpendicular to the substrate;
(c) a separator wall sized to fit into the slots in the opposed inner wall faces of the frame to divide the interior cavity within the frame into at least two chambers, the separator wall having at least one opening therein to provide controlled communication between the two chambers in the frame, the frame and the separator wall each having a top surface which is substantially flat and at the same level; and
(d) a top cover formed of metal secured over the top of the frame and the separator wall to seal the cavity within the frame from the exterior ambient and to seal the chambers formed within the frame from one another.

18. The fluid control unit of claim 17 including at least two openings formed in the top cover, one of the openings communicating from the exterior of the top cover into one of the chambers within the frame and the other opening communicating from the exterior of the cover to the other chamber within the frame.

19. The fluid control unit of claim 17 further including an actuator plunger formed to fit within one of the chambers, means for mounting the actuator plunger within the chamber for linear movement parallel to the surface of the substrate, the plunger having a valve head with a face thereon formed to seal an orifice formed in the separator wall when the valve head is engaged to the separator wall surrounding the orifice and a magnetic head formed of magnetic material, a fixed magnetic core formed on the substrate having faces spaced apart to define a gap and a coil of electrical conductor coupled to the fixed magnetic core to provide flux to the fixed magnetic core and through the gap when the coil is provided with electrical current such that when the coil is provided with current the magnetic head of the plunger is drawn into the gap in the fixed magnetic core to drive the valve head against the separator wall to close the orifice in the separator wall.

20. The fluid control unit of claim 19 wherein the magnetic core is formed of ferromagnetic material and the frame walls and the cover are formed of a nonferromagnetic metal.

21. The fluid control unit of claim 20 wherein the fixed magnetic core is formed as two separate sections on the substrate, and wherein receptacle openings are formed in the fixed sections of the core to extend downwardly from a top surface of each fixed section, and wherein the coil is wound around a mandrel of ferromagnetic material, the mandrel having end sections with pegs extending therefrom formed to fit in the receptacles in the fixed sections of the core, and wherein the pegs are inserted into the fixed sections of the core to complete a magnetic circuit through the mandrel, the fixed sections of the core, and the gap between the fixed sections.

22. The flow control unit of claim 20 wherein the fixed sections of the core are formed of permalloy and the walls of the frame and the cover are formed of copper.

23. The flow control unit of claim 17 wherein the metal frame and separator wall have a height of about 2 mm or less.

24. A micromagnetic circuit structure comprising:

(a) a nonferromagnetic substrate having a top surface;

(b) a fixed magnetic core formed by electrodeposition on the top surface of the substrate, the core formed of a ferromagnetic material, the core having a top surface and receptacle openings formed therein extending downwardly from the top surface of the fixed core; and (c) a coil section comprising a mandrel of ferromagnetic material and a coil of electrical conductor wound around the mandrel, the mandrel having end sections with pegs extending therefrom formed to fit in the receptacle openings in the fixed core sections, the pegs on the mandrel inserted into the receptacle openings in the fixed core section to complete a magnetic circuit.

25. The micromagnetic circuit structure of claim 24 wherein the fixed magnetic core is formed to a height of about 2 mm or less.

26. The micromagnetic circuit structure of claim 24 wherein the fixed core is formed of two separate core sections, each core section having a top surface with at least one receptacle opening formed therein.

27. The micromagnetic circuit structure of claim 26 further comprising a wall of nonferromagnetic material deposited on the surface of the substrate and over the two fixed magnetic core sections in sealing contact therewith, the wall forming a frame which surrounds the gap in the fixed core sections.

28. The micromagnetic circuit structure of claim 27 wherein the top surface of the frame wall is substantially planar and parallel to the surface of the substrate, and further including a cover of nonferromagnetic material secured to the top surface of the frame wall to provide a complete enclosure around the gap between the two fixed core sections, wherein the mandrel is mounted to the fixed core sections at the receptacles located outside of the frame wall, with the mandrel extending over the outside of the frame and cover enclosure, and the coil formed on the mandrel outside of the enclosure.

29. The micromagnetic circuit structure of claim 24 wherein the pegs on the mandrel have outwardly extending clips formed thereon which are adapted to be compressed as the pegs are inserted into the receptacle openings, the clips as compressed holding the mandrel in position on the fixed core.

30. The micromagnetic circuit structure of claim 24 wherein each fixed core section has a set of receptacle openings for a mandrel, each set comprising a central opening and at least one side opening on each side of the central opening, and wherein the end sections of the mandrel have a central peg inserted into the central opening and side pegs inserted into the side openings.

* * * * *